(12) United States Patent
Bell

(10) Patent No.: US 9,526,260 B2
(45) Date of Patent: *Dec. 27, 2016

(54) SYSTEMS AND METHODS FOR MAINTAINING PERISHABLE FOODS

(75) Inventor: Laurence D. Bell, Mountain View, CA (US)

(73) Assignee: GLOBAL FRESH FOODS, San Francisco, CA (US)

( * ) Notice: Subject to any disclaimer, the term of this patent is extended or adjusted under 35 U.S.C. 154(b) by 1157 days.

This patent is subject to a terminal disclaimer.

(21) Appl. No.: 13/498,850

(22) PCT Filed: Oct. 28, 2010

(86) PCT No.: PCT/US2010/054421
§ 371 (c)(1),
(2), (4) Date: Jun. 28, 2012

(87) PCT Pub. No.: WO2011/053676
PCT Pub. Date: May 5, 2011

(65) Prior Publication Data
US 2012/0294987 A1    Nov. 22, 2012

Related U.S. Application Data

(60) Provisional application No. 61/275,720, filed on Oct. 30, 2009, provisional application No. 61/256,868, filed on Oct. 30, 2009.

(51) Int. Cl.
*B65D 81/18* (2006.01)
*A23B 4/16* (2006.01)
(Continued)

(52) U.S. Cl.
CPC .................. *A23B 4/16* (2013.01); *A23L 3/001* (2013.01); *A23L 3/3418* (2013.01); *B65B 31/00* (2013.01);
(Continued)

(58) Field of Classification Search
CPC .......... A23B 4/16; A23L 3/001; A23L 3/3418; B65B 31/00; H01M 8/04201; H01M 2008/1095; H01M 2250/00
See application file for complete search history.

(56) References Cited

U.S. PATENT DOCUMENTS 3,415,310 A    12/1968    Kuhlmann
3,437,428 A    4/1969    Camilo et al.
(Continued)

FOREIGN PATENT DOCUMENTS

DE    44 30 617 A1    2/1996
JP    55-045386    9/1978
(Continued)

OTHER PUBLICATIONS

Declaration of Laurence D. Bell dated Oct. 26, 2011, for U.S. Appl. No. 11/769,944.
(Continued)

*Primary Examiner* — Steven Leff
(74) *Attorney, Agent, or Firm* — The Marbury Law Group PLLC

(57) ABSTRACT

Disclosed are packaging systems and methods useful in extending the storage-life of foodstuff such as fresh fish. The packaging systems and methods can be used to transport or store the foodstuff for an extended period of time. The packaging systems preferably employee a high headspace and flexible architecture and may use a fuel cell to maintain a reduced oxygen level in a high carbon dioxide environment surrounding the foodstuff. Also disclosed are methods useful in extending the storage-life of foodstuff such as fresh fish. The methods can be used to transport or store the foodstuff for an extended period of time. The methods
(Continued)

preferably use a low oxygen gas source to maintain a reduced oxygen level in the environment surrounding the foodstuff.

22 Claims, 12 Drawing Sheets

(51) Int. Cl.
*A23L 3/00* (2006.01)
*A23L 3/3418* (2006.01)
*B65B 31/00* (2006.01)
*H01M 8/04* (2016.01)
*H01M 8/10* (2016.01)

(52) U.S. Cl.
CPC . *H01M 8/04201* (2013.01); *H01M 2008/1095* (2013.01); *H01M 2250/00* (2013.01)

(56) References Cited

U.S. PATENT DOCUMENTS

| | | | |
|---|---|---|---|
| 3,563,757 A | 2/1971 | Dixon |
| 3,598,518 A | 8/1971 | Goto |
| 3,937,847 A | 2/1976 | Elkins et al. |
| 3,992,271 A | 11/1976 | Danzig et al. |
| 4,039,409 A | 8/1977 | LaConti et al. |
| 4,212,891 A | 7/1980 | Fujita et al. |
| 4,311,569 A | 1/1982 | Dempsey et al. |
| 4,513,066 A | 4/1985 | Simon |
| 4,609,383 A | 9/1986 | Bonaventura et al. |
| 4,642,996 A | 2/1987 | Harris et al. |
| 4,779,398 A | 10/1988 | Glandon et al. |
| 4,817,391 A | 4/1989 | Roe et al. |
| 4,895,729 A | 1/1990 | Powrie et al. |
| 5,438,841 A | 8/1995 | Cahill-O'Brien et al. |
| 5,457,963 A | 10/1995 | Cahill-O'Brien et al. |
| 5,647,970 A | 7/1997 | Arata |
| 6,013,385 A | 1/2000 | DuBose |
| 6,023,915 A | 2/2000 | Colombo |
| 6,054,161 A | 4/2000 | Palmer |
| 6,125,613 A | 10/2000 | Eberhardt et al. |
| 6,171,368 B1 | 1/2001 | Maget et al. |
| 6,179,986 B1 | 1/2001 | Swette et al. |
| 6,180,146 B1 | 1/2001 | Del Gallo et al. |
| 6,230,614 B1 | 5/2001 | Del Gallo et al. |
| 6,256,905 B1 | 7/2001 | White |
| 6,430,467 B1 | 8/2002 | D'Amelio et al. |
| 6,562,258 B1 | 5/2003 | Elsome et al. |
| 6,808,837 B2 | 10/2004 | Hirsch |
| 6,941,727 B2 | 9/2005 | Villers et al. |
| 7,014,898 B2 | 3/2006 | Ekman et al. |
| 2004/0031240 A1 | 2/2004 | Villers et al. |
| 2005/0074531 A1 | 4/2005 | Patterson |
| 2006/0073244 A1 | 4/2006 | Brackenridge et al. |
| 2006/0105219 A1 | 5/2006 | Anderson |
| 2006/0127734 A1 | 6/2006 | McLean et al. |
| 2007/0012703 A1 | 1/2007 | Owensby |
| 2007/0077470 A1 | 4/2007 | Adams et al. |
| 2007/0077480 A1 | 4/2007 | Curello et al. |
| 2007/0110861 A1 | 5/2007 | Hoffjann et al. |
| 2008/0003334 A1 | 1/2008 | Bell et al. |
| 2008/0145721 A1 | 6/2008 | Shapiro et al. |
| 2009/0081493 A1 | 3/2009 | Schrooten et al. |
| 2010/0159349 A1 | 6/2010 | Highgate et al. |
| 2011/0151070 A1 | 6/2011 | Bell |
| 2011/0151084 A1 | 6/2011 | Bell |

FOREIGN PATENT DOCUMENTS

| | | |
|---|---|---|
| JP | 09-201182 A | 8/1997 |
| JP | 2004-095515 | 3/2004 |
| WO | WO-2008/005810 | 1/2008 |
| WO | WO2008005810 A2 | 1/2008 |
| WO | WO2011053676 A2 | 5/2011 |

OTHER PUBLICATIONS

Eva Tallaksen, "Scientist: GFF 30-day claim must be taken 'with pinch of salt,'" in IntraFish Media AS (Apr. 26, 2011).
Farber, J. M., "Microbiological aspects of modified-atmosphere packaging technology: a review." J. Food Protect. (1991) 54:58-70.
Eurasian Patent Organization Office Action for Application No. 201290214/31 (6 pages).
Eurasian Patent Organization Office Action for Application No. 201290214/31, dated Jan. 27, 2016, (5 pages).
Japanese Pre-Appeal Notice for JP 2015-019704, dated Feb. 9, 2016, 1page.
Zhao, et al., "Dynamic Changes of Headspace Gases in CO2 and N2 Packed Fresh Beef," J. Food Svc., (1995), 60(3):571-575.
Chinese Notification of Reexamination for CN Patent Application No. 201080048445.7, issued Jul. 6, 2016, with English language translation, 17 pages.
Japanese Office Communication Notice of Reasons for Rejection for Japanese Patent Application No. 212-537031, issued Aug. 30, 2016, with English language translation, 8 pages.
Official Communication "Technical Report" from the Costa Rica Patent Office for Costa Rica Patent Application No. 2012-0222, dated Oct. 13, 2016, 2 pages.
Canadian Office Communication, Examination Report for CA Application No. 2,776,555, dated Sep. 29, 2016, 3 pages.

SYSTEMS AND METHODS FOR MAINTAINING PERISHABLE FOODS

CROSS REFERENCE TO RELATED APPLICATIONS

This application is a 371 of PCT/US2010/054421, filed Oct. 28, 2010, which claims the benefit of U.S. Provisional Application Nos. 61/275,720, filed Oct. 30, 2009, and 61/256,868, filed Oct. 30, 2009.

FIELD OF THE INVENTION

This invention relates to systems and methods for increasing the storage-life of oxidatively-degradable foodstuffs such as fresh fish.

BACKGROUND

The storage-life of oxidatively-degradable foodstuffs such as fish, meat, poultry, bakery goods, fruits, grains, and vegetables is limited in the presence of a normal atmospheric environment. The presence of oxygen at levels found in a normal atmospheric environment leads to changes in odor, flavor, color, and texture resulting in an overall deterioration in quality of the foods either by chemical effect or by growth of aerobic spoilage microorganisms.

Modified atmosphere packaging (MAP) has been used to improve storage-life and safety of stored foods by inhibition of spoilage organisms and pathogens. MAP is the replacement of the normal atmospheric environment in a food storage pack with a single gas or a mixture of gases. The gases used in MAP are most often combinations of oxygen ($O_2$), nitrogen ($N_2$), and carbon dioxide ($CO_2$). In most cases, the bacteriostatic effect is obtained by a combination of decreased $O_2$ and increased $CO_2$ concentrations. Farber, J. M. 1991. Microbiological aspects of modified-atmosphere packaging technology: a review. J. Food Protect. 54:58-70.

In traditional MAP systems, the MAP gas composition is not manipulated after the initial replacement of the normal atmospheric environment. Thus, the composition of the gases present in the food pack is likely to change over time. Changes in the gas portion of the packaging can be due to diffusion of gases into and out of the product, diffusion of gases into and out of the food pack, and the effects of microbiological metabolism. In certain cases, the foodstuff will absorb carbon dioxide ($CO_2$) reducing the amount of $CO_2$ in the gas portion of the packaging with a concomitant increase in the relative amounts of other gases such as oxygen. Carbon dioxide absorption can lead to a negative pressure in the tote creating a "vacuumizing" situation which could potentially damage the foodstuff by, e.g., reducing the carbon dioxide concentration below levels effective for inhibiting microbial spoilage of the foodstuff with corresponding increases in residual oxygen concentrations. Vacuumization caused by $CO_2$ absorption can also cause leakage, especially in rigid totes, resulting in failures.

The use of MAP systems and related technologies has been in use for shipping and storage of foodstuff. However, these systems imposed significant limitations on the delivery of food stuffs that are sensitive to oxidative degradation, such as fish. First and most important, the cooling and oxygen removal processes of these systems were integrated into a single sealed container (typically a refrigerated freight container—a reefer unit) such that upon opening the entire shipment was exposed to the ambient atmospheric conditions. This limited the ability to split the foodstuff into different delivery sites and typically required that the vendee acquire the entire product upon opening. Second, the integration of the oxygen removal process into the container dictated that inadvertent or premature breakage of the seal in the sealed container put the entire product at risk. Third, the integration of the oxygen removal processes into the freight container did not permit separate atmospheric conditions within the container during storing and/or transporting thereby limiting the flexibility of the process. Fourth, sealing of a freight container posed difficulties especially when the atmospheric pressure within the container became less than that outside of the container. The most common MAP applications employ a bag-in-box architecture whereby the perishable is contained inside a bag/package that is contained inside a box/carton. The bag/package is gas flushed one or more times to create the desired modified atmosphere before the bag/package is heat sealed and the box closed. This system may or may not employ excess headspace to allow for overfilling of gases such as $CO_2$ that are absorbed by many perishables. The typical constraint on how much excess headspace can be employed is the requirement that these MAP packages be unitized (stacked) for transport and handling. This architectural constraint dictates an external carton or box that can be closed around the bag/package and stacked and easily handled throughout the supply chain. Consequently, the "excess" headspace designed into these architectures is inadequate to prevent a decrease in $CO_2$ partial pressures over time with a corresponding increase in oxygen.

In addition to traditional MAP systems as discussed above, systems for transporting perishable foodstuffs using an external fuel cell to remove oxygen have been developed, such as disclosed by U.S. Pat. No. 6,179,986. This patent does not describe the use of a fuel cell but instead it discloses the use of a proton exchange membrane (PEM) stack based solid polymer electrolyte (EOC) electrochemical oxygen control system which is operated differently than a fuel cell and requires the application of DC power. The PEM is operated external to the sealed container to the extent that it required venting of at least one of the products of the fuel cell reaction to the outside of the sealed container. Additionally, the system described in the '986 patent required the use of a dedicated power supply to provide power to the fuel cell.

The systems described above have many disadvantages that make them undesirable for long-term transporting or storing of foodstuff that is oxidatively degradable. Thus, the need exists for an improved system that would increase the storage-life of oxidatively-degradable materials during transport and storage that avoids the disadvantages of conventional shipping and storage techniques. Additionally, it would be advantageous to have the ability to transport and then remove modular packages of the transported foodstuff at various destinations without compromising the preserving environment of the packages.

Further these architectures, which are usually small in size, generally dictate a one-time (multiple gas flush event) as they do not have any valves or fittings to facilitate the initial or additional gas flushes after the initial gas flush process. Furthermore, multiple gas flushes are not economically viable due to the necessity of reasonable production throughput requirements. Since these architectures are generally small, easily handled packages (usually 40 pounds or less) the cost per pound to employ the MAP process is very high and resulting MAP gas mixture less than ideal for maximum shelf life extensions.

An improvement to the above is disclosed in U.S. Ser. No. 11/769,944 where a fuel cell is integrated with a tote comprising oxidatively degradable foodstuffs and an internal hydrogen source. The fuel cell operates to convert excess oxygen in the tote to water by reaction with hydrogen.

Thus, the art to date can be generally characterized as sealed systems which either do or do not remove residual oxygen from the interior of the system by chemical, electrical or catalytic processes.

It would be beneficial to avoid the functional and economic deficiencies of existing processes for removing oxygen from such storage systems. And there is a need to remove residual oxygen from such storage systems.

SUMMARY OF THE INVENTION

In one aspect, this invention provides for totes, packaging modules, systems, and methods useful in extending the storage-life of carbon dioxide absorbing foodstuff such as fresh fish. One aspect of the invention provides for a pressure-stable sealable tote of limited oxygen permeability useful in transporting and/or storing of oxidatively-degradable foodstuffs. The tote comprises one or more fuel cells, contained internal to the tote, that are capable of converting hydrogen and oxygen into water. The tote further optionally comprises a holding element suitable for maintaining a hydrogen source internal to the tote. The holding element for the hydrogen source in the tote preferably is a box or bladder configured to hold the hydrogen source and, in some embodiments, the fuel cell. In preferred embodiments, the tote is selected from the group consisting of a tote comprising a flexible, collapsible or expandable material which does not puncture when collapsing or expanding. In other embodiments, the one or more fuel cells and/or the hydrogen source may be external to the tote. When external to the tote, the fuel cells are in gaseous communication with the tote.

This aspect of the invention is based on the discovery that carbon dioxide absorbing foodstuffs such as fresh fish can significantly and detrimentally affect the gas composition of the atmosphere above the fish. In such embodiments, initially acceptable low levels of e.g., oxygen, will increase as more and more carbon dioxide is absorbed leading to higher oxygen levels in the remaining gas. It can also create a "vacuumizing" situation which could potentially damage the product, and the tote causing structural damages, or reducing the carbon dioxide concentration below levels effective for inhibiting microbial spoilage.

In the extreme, sufficient amounts of carbon dioxide are absorbed that little or no head space remains after storage or shipping leaving a detrimental vacuum situation.

This aspect of the invention is further based on the discovery that the above problem can be addressed by a packaging module useful in transporting and/or storing carbon dioxide absorbing foodstuffs which comprises a pressure-stable sealed tote of limited oxygen permeability and a defined headspace wherein the tote consists of a flexible, collapsible or expandable material which does not puncture when collapsing or expanding, an oxidatively-degradable, carbon dioxide absorbing foodstuff, a fuel cell used in conjunction with the tote that is capable of converting hydrogen and oxygen into water, a hydrogen source contained, preferably contained internal to the tote and further wherein the initial headspace occupies at least 30 volume percent of the tote and the gas in the headspace comprises at least 99 vol. percent gases other than oxygen. In one embodiment, the headspace is at least 50 vol. percent of the tote. In one embodiment, the headspace is about or at least 69 vol. percent of the tote. In one embodiment, the gas in the headspace comprises at least 60 vol. percent carbon dioxide. In another embodiment, the gas in the headspace comprises at least 90 vol. percent carbon dioxide.

In this embodiment, the carbon dioxide initially in the head space greatly exceeds the amount of carbon dioxide which will be absorbed by the foodstuff thereby providing compensation for its absorption. The amount of carbon dioxide which can be absorbed by the foodstuff during storage and/or transportation can be determined empirically or is known in the art.

Another aspect of the invention provides for a system useful in transporting and/or storing of carbon dioxide absorbing oxidatively-degradable foodstuffs which comprises one or more totes. Each packing module comprises a pressure-stable sealed tote of limited oxygen permeability wherein the tote consists of a flexible, collapsible or expandable material which does not puncture when collapsing or expanding, an oxidatively-degradable, carbon dioxide absorbing foodstuff, a fuel cell that is capable of converting hydrogen and oxygen into water, a hydrogen source, and further wherein the initial headspace occupies at least 30 volume percent of the tote. In one embodiment, the initial headspace is at least 50 vol. percent of the tote. In another embodiment, the initial headspace is about or at least 69 vol. percent of the tote. In some embodiments, the gas in the headspace comprises at least 99 vol. percent gases other than oxygen. In one embodiment, the gas in the headspace comprises at least 60 vol. percent carbon dioxide. In another embodiment, the gas in the headspace comprises at least 90 vol. percent carbon dioxide.

In some embodiments, the fuel cell and/or the hydrogen source are internal to the tote. In some embodiments, the packaging module further comprises a holding element suitable for maintaining a hydrogen source internal to the tote; preferably the holding element for the hydrogen source in the tote is a box or bladder configured to hold the hydrogen source and optionally the fuel cell. In some embodiments, the fuel cell and/or the hydrogen source are external to the tote. When the fuel cell is external to the tote, it is in gaseous communication with the tote and one fuel cell may be in gaseous communication with one or multiple totes and the product of the fuel cell may be internal or external to the tote.

In some embodiments, the oxidatively-degradable, carbon dioxide absorbing foodstuffs to be transported and/or stored are preferably fish. More preferably, the fish is fresh fish selected from the group consisting of salmon, tilapia, tuna, shrimp, trout, catfish, sea bream, sea bass, striped bass, red drum, pompano, haddock, hake, halibut, cod, and arctic char. Most preferably, the fresh fish to be transported and/or stored is salmon or tilapia. Fresh cooked perishable food would also benefit in the low oxygen environment Additionally, in some embodiments, the hydrogen source is either a bladder hydrogen source, a rigid container hydrogen source, or a gaseous mixture comprising carbon dioxide and less than 5% by volume hydrogen. In some embodiments the packaging module further comprises a fan. In some embodiments, the fan is powered by the fuel cell. In some embodiments, the fan is powered by another power source.

The system, in some embodiments, further comprises a temperature control system which may be internal or external to the packaging module to maintain the temperature inside the module at a level sufficient to maintain freshness of the foodstuff.

Another aspect of the invention provides for a method for transporting and/or storing of oxidatively-degradable foodstuffs using the packaging modules described above. The method comprises the steps of removing the oxygen in a packaging module containing an oxidatively-degradable, carbon dioxide absorbing foodstuff to generate a reduced oxygen environment within a packaging module, filling the tote with low oxygen gas to provide an initial gaseous headspace wherein the initial headspace occupies at least 30 volume percent of the tote and the gas in the headspace comprises at least 99 vol. percent gases other than oxygen, sealing the tote, operating the fuel cell during transport or storing such that oxygen in the tote is converted to water by reaction with hydrogen to maintain the reduced oxygen environment within the tote, and transporting or storing the material in the tote. The packaging module comprises a pressure-stable sealable tote of limited oxygen permeability wherein the tote consists of a flexible, collapsible or expandable material which does not puncture when collapsing or expanding, a fuel cell, and a hydrogen source. In one embodiment, the gas in the headspace comprises at least 60 vol. percent carbon dioxide. In another embodiment, the gas in the headspace comprises at least 90 vol. percent carbon dioxide.

In one embodiment, the oxygen removal process occurs before adding the foodstuff to the tote; in another embodiment it occurs after adding the foodstuff to the tote. In some embodiments, the tote comprises plumbing valves and fittings within the tote for use to flush the tote with a low oxygen gas source to fill the headspace. In some embodiments, the tote is flushed prior to turning on the fuel cell. The fuel cell then continues to remove residual oxygen.

The method can be used in the transporting or storing the foodstuff for a time period up to 100 days. For example, the time period for storage is from between 5 and 50 days, or alternatively, from between 5 and 45, or between 15 and 45 days. In some embodiments, the method further comprises maintaining a temperature in the tote sufficient to maintain freshness of the material during transport or storage.

In preferred embodiments, the method is performed so that the reduced oxygen environment comprises less than 1% oxygen, or alternatively, the reduced oxygen environment comprises less than 0.1% oxygen, or alternatively, the reduced oxygen environment comprises less than 0.01% oxygen.

The reduced oxygen environment comprises carbon dioxide and hydrogen; comprises carbon dioxide and nitrogen; comprises nitrogen; or comprises carbon dioxide, nitrogen, and hydrogen.

Yet another aspect of this invention provides for methods for removing oxygen internal to a tote comprising an oxidatively degradable foodstuff without the need for the use of any chemical, electrical and/or catalytic processes.

In particular, this aspect of the invention is predicated on the discovery that totes having appropriate architecture will permit flushing of the tote with a low oxygen gas source such that any oxygen accumulating in the tote is flushed from the tote prior to reaching concentration levels that adversely affect the foodstuff. Accordingly, in one of its method aspects, there is provided a method for removing oxygen from a tote having oxidatively degradable foodstuff(s) which method comprises:

a) a tote having a sealable gas inlet port and a sealable gas outlet port both ports being positioned in the head space of the tote wherein the tote comprises a flexible, collapsible or expandable material which does not puncture when collapsing or expanding;

b) adding oxidatively degradable foodstuff(s) to said tote in an amount such that the inlet and outlet ports are not obstructed;

c) sealing the tote;

d) conducting one or more initial flushings of the tote with a low oxygen gas source by injecting a sufficient amount of such gas source into the tote through the inlet port while emitting gas through the outlet port so as to provide a low oxygen atmosphere in the tote and a gaseous head space of sufficient volume to permit absorption of gas into the foodstuff without increasing oxygen content in remaining gaseous head space in the tote to a level of above about 1500 ppm;

e) sealing the inlet and outlet ports; and f) optionally periodically flushing the tote with a low oxygen gas source such that after flushing there remains a sufficient gaseous head space to compensate for gas absorption into the foodstuff such that the oxygen concentration in the remaining gaseous head space does not exceed 1500 ppm at any given time.

In preferred embodiments, the tote does not contain any internal components to remove oxygen from the tote such as a fuel cell, a catalyst, and the like.

The oxidatively-degradable foodstuffs to be transported and/or stored are preferably fish. More preferably, the fish is fresh fish selected from the group consisting of salmon, tilapia, tuna, shrimp, trout, catfish, sea bream, sea bass, striped bass, red drum, pompano, haddock, hake, halibut, cod, and arctic char. Most preferably, the fresh fish to be transported and/or stored is salmon or tilapia.

The vertical architecture of the totes disclosed herein facilitates minimizing horizontal space requirements for shipping the maximum number of pallets side-by-side. Embodiments that spread the headspace out horizontally may not be as economically viable at a large scale in addition to not enjoying the leak resistance as long as the headspace remains positive. In certain embodiments, no more than about 20% of the expansion of the tote is in the horizontal direction, with the remainder of the gaseous expansion being in the vertical direction thus creating the "head pressure" and head space height of the totes. The tote is configured to expand in a vertical manner creating an initial "head pressure". Initial tote head pressures can range from about 0.1 to about 1.0 inches of water column or more above atmospheric pressure. The flexible tote can be made more flexible in the vertical direction than in the horizontal by conventional methods, such as using more flexible material in the vertical direction.

Additionally, in some embodiments, the low oxygen gas source is any external gas source that can be adapted to provide the gas source to the inlet port of the tote. Preferably, the gas source is carbon dioxide and, more preferably, the carbon dioxide contains less than about 1500 ppm of oxygen. Still more preferably, the carbon dioxide to be injected into the tote contains less than about 100 ppm oxygen.

The tote, in some embodiments, further comprises a temperature control system external to the packaging module to maintain the temperature inside the module at a level sufficient to maintain freshness of the foodstuff.

Another aspect of the invention provides for a method for transporting and/or storing of oxidatively-degradable foodstuffs within the totes described above. The method comprises the steps of flushing oxygen from the tote with carbon dioxide containing less than 1500 ppm oxygen wherein the tote contains an oxidatively-degradable foodstuff thereby generating a reduced oxygen environment within the tote, sealing the tote, and optionally periodically flushing the tote with carbon dioxide to maintain the reduced oxygen environment within the tote, and transporting and/or storing the foodstuff in the tote wherein the tote comprises a flexible, collapsible or expandable material which does not puncture when collapsing or expanding.

In one embodiment, the oxygen removal process occurs before adding the foodstuff to the tote; in another embodiment it occurs after adding the foodstuff to the tote. In one embodiment, oxygen removal can be achieved by employing a gas flush via inlet and outlet ports preferably installed positioned in the head space of the tote. In some embodiments, multiple periodic gas flushes can be employed. The inlet and outlet ports are sealable such that after the tote is flushed with a low oxygen gas source, the interior of the tote is isolated. In one embodiment, the inlet and outlet ports are holes wherein one can simply cover and uncover the holes when gas flushing is required. In such an embodiment, the holes (inlet and outlet ports) can be covered using tape. This allows for the inlet and outlet ports to be sealed and unsealed periodically. This architecture facilitates the economical practice of employing multiple gas flushes over time to remove oxygen and elevate levels of the low oxygen gas, such as nitrogen and/or $CO_2$.

The method can be used in the transporting and/or storing the foodstuff for a time period up to 100 days. In certain embodiments, the method can be used for transporting and/or storing the foodstuff for a time period of more than 100 days. For example, the time period for storage is from between 5 and 50 days, or alternatively, from between 15 and 45 days. In some embodiments, the method further comprises maintaining a temperature in the tote sufficient to maintain freshness of the material during transport or storage.

In preferred embodiments, the method is performed so that the reduced oxygen environment comprises less than 2% oxygen, or alternatively, the reduced oxygen environment comprises less than 1.5% oxygen, or alternatively, the reduced oxygen environment comprises less than 1% oxygen, or alternatively, the reduced oxygen environment comprises less than 0.1% oxygen, or alternatively, the reduced oxygen environment comprises less than 0.01% oxygen. The level of oxygen can be monitored.

The reduced oxygen environment comprises carbon dioxide, or in some cases, comprises carbon dioxide and nitrogen.

BRIEF DESCRIPTION OF THE DRAWINGS

This invention will be further described with reference being made to the accompanying drawings.

DETAILED DESCRIPTION

Figure 1:
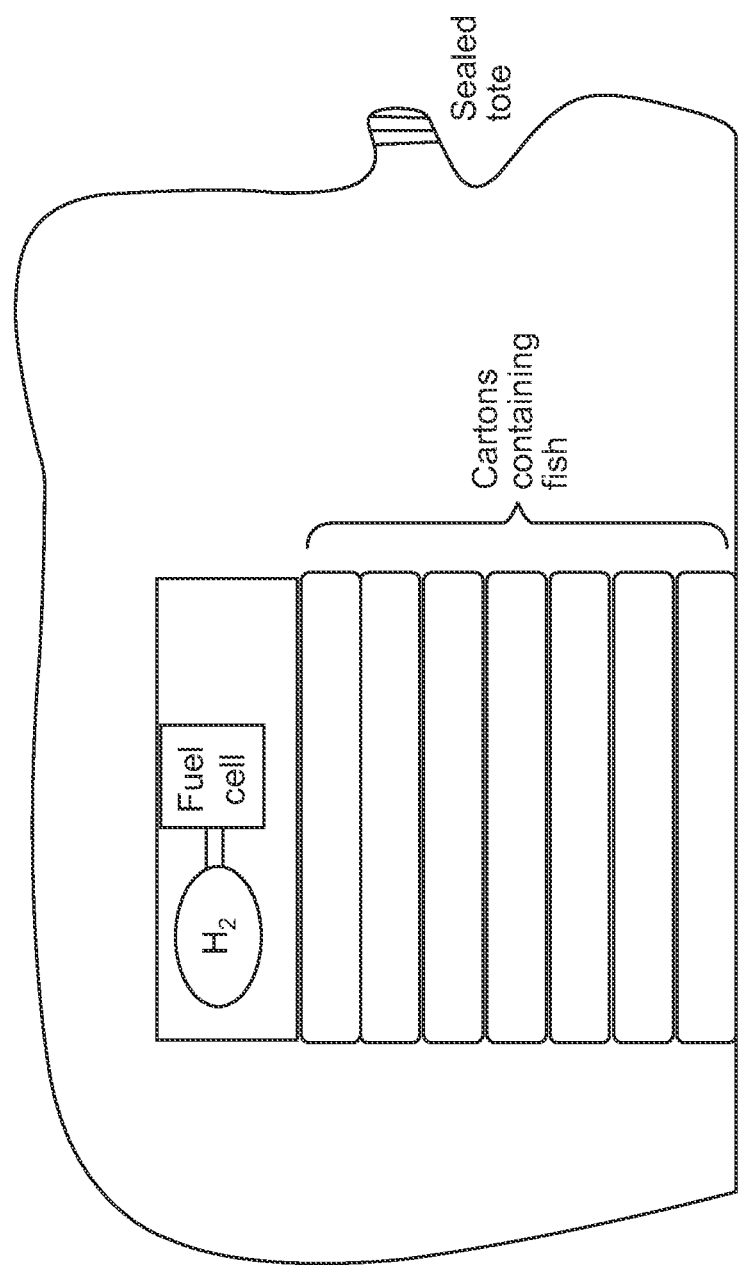
FIG. 1 is a schematic of a packaging module used to transport or store oxidatively-degradable material.

The present invention encompasses systems and methods useful for transporting and storing oxidatively-degradable foodstuffs. The systems and methods described herein allow for the removal of oxygen, for example, periodic or continuous, from the atmospheric environment surrounding an oxidatively degradable foodstuff which is stored in an individual tote within a shipping container. In some embodiments, the food stuff is carbon dioxide absorbing oxidatively-degradable foodstuff.

The totes or packaging modules used in this invention, as described more completely below, preferably do not incorporate an integrated temperature control system but rather rely upon the temperature control system of the shipping container in which they are shipped. In addition, the tote or packaging module is designed to withstand or compensate for the internal pressure loss (or gain), such as non-oxygen (carbon dioxide) gas absorption by the foodstuff, during transport and/or shipment, for example, by employing a flexible, collapsible or expandable material which does not puncture when collapsing or expanding and by further employing a gaseous head space within the tote that compensates for such absorption without creating a vacuum condition and/or permitting the oxygen content of the gas in the tote to exceed 1500 ppm.

The periodic or continuous removal of oxygen during transport and/or storage allows for a controlled reduced oxygen environment that is suitable to maintain the freshness of the material for a prolonged period. As a result, oxidatively-degradable materials can be transported and/or stored for longer periods of time than are currently possible using conventional shipping and storage techniques. The methods described herein allow, for example, the use of shipping freighters to transport oxidatively-degradable materials, such as carbon dioxide absorbing oxidatively-degradable foodstuffs, for example fish, to markets that would normally only be served by more expensive air shipping.

In one embodiment, this invention provides systems and methods useful for extending the storage life of oxidatively-degradable foodstuffs. In a preferred embodiment, the oxidatively-degradable foodstuff is nonrespiratory. Nonrespiratory foodstuffs do not respire. That is to say that these foodstuffs do not take in oxygen with an associated release of carbon dioxide. Examples of nonrespiratory foodstuff include fresh or processed fish, meat (such as beef, pork, and lamb), poultry (such as chicken, turkey, and other wild and domestic fowl), and bakery goods (such as bread, tortillas, and pastries, packaged mixes use to generate bread and pastries, and grain-based snack foods). Preferred nonrespiratory foodstuff to be transported/and or stored by the systems and methods of this invention include fresh or processed fish, such as salmon, tilapia, tuna, shrimp, trout, catfish, sea bream, sea bass, striped bass, red drum, pompano, haddock, hake, halibut, cod, arctic char, shellfish, and other seafood. More preferably, the nonrespiratory foodstuff is fresh salmon or fresh tilapia, and most preferably the nonrespiratory foodstuff fresh Chilean Atlantic farmed salmon.

In general, the systems and methods of the invention involve a tote, the oxidatively-degradable foodstuff to be transported and/or stored, and a low oxygen gas source that periodically flushes the tote with a low oxygen gas, such as carbon dioxide, thus removing any available oxygen from inside the tote so as to control the gaseous environment surrounding the foodstuff at least for a portion of the storage and/or transportation period. In a preferred embodiment, the reduced oxygen environment within the tote is created by flushing the environment within the tote via application of a vacuum and/or introduction of a low oxygen gaseous source via an inlet port while the gas present in the interior of the tote is expelled through the outlet port. After flushing of the tote, the inlet and outlet ports are sealed, and the environment within the tote is a reduced oxygen environment. Optionally, the tote is then periodically flushed with carbon dioxide oxygen as needed throughout the duration of the transport and/or storage when oxygen is present to maintain the reduced oxygen environment within the packaging module, thus maintaining the freshness of the oxidatively-degradable material. In certain embodiments, an oxygen sensor is present internal to the tote in order to signal the need for flushing with carbon dioxide.

In some embodiments, the systems and methods of the invention involve a packaging module comprising a tote, the carbon dioxide absorbing oxidatively-degradable foodstuff to be transported and/or stored, and a device that continuously removes any available oxygen from inside the tote when oxygen is present so as to control the gaseous environment surrounding the foodstuff at least for a portion of the storage and/or transportation period. This device is also referred to as an oxygen remover. In some cases, it will be desirable to employ more than one oxygen remover to more effectively remove oxygen from the tote environment. The carbon dioxide absorbing oxidatively-degradable foodstuff is inserted into the tote and the environment in the tote is manipulated to create a reduced oxygen environment in the tote. In a preferred embodiment, the reduced oxygen environment within the tote is created by flushing the environment within the tote via application of a vacuum and/or introduction of a low oxygen gaseous source. After flushing of the tote, the environment within the tote is a reduced oxygen environment. The tote is filled with the low oxygen gas to provide a gaseous headspace such that the volume of gaseous headspace is greater than the volume of gas which is absorbed by the carbon dioxide absorbing oxidatively-degradable foodstuff. In one embodiment, the tote is filled with carbon dioxide such that the gaseous head space occupies at least 30 vol. percent of the total volume of the tote and the gas in the head space comprises at least 99 vol. percent carbon dioxide. The tote is then sealed. The oxygen remover operates throughout the duration of the transport and/or storage when oxygen is present to maintain the reduced oxygen environment within the packaging module, thus maintaining the freshness of the carbon dioxide absorbing oxidatively-degradable material. However, as the amount of carbon dioxide employed is significantly greater than the amount which will be absorbed by the foodstuff, the amount of oxygen in the headspace on a vol. percent basis is limited as is the likelihood of tote collapse if the gaseous head space is insufficient to account for carbon dioxide absorption.

The term "low oxygen gas source" refers to gas sources containing less than a 1000 ppm oxygen; preferably, less than 100 ppm oxygen; and more preferably, less than 10 ppm oxygen. The low oxygen gaseous source is preferably comprised of $CO_2$ or mixture of gases containing $CO_2$ as one of its components. $CO_2$ is colorless, odorless, noncombustible, and bacteriostatic and it does not leave toxic residues on foods. In one embodiment, the low oxygen gaseous source is 100% $CO_2$. In another embodiment, the low oxygen gaseous source is a mixture of $CO_2$ and nitrogen or other inert gas. Examples of inert gases include, but are not limited, to argon, krypton, helium, nitric oxide, nitrous oxide, and xenon. The identity of the low oxygen gaseous source can be varied as suitable for the foodstuff and is well within the knowledge and skill of the art. For example, the low oxygen gaseous source used for transport and storage of salmon is preferably 100% $CO_2$. Other fish, such as tilapia are preferably stored or shipped using 60% $CO_2$ and 40% nitrogen as the low oxygen gaseous source.

As described above, the pressure-stable sealable tote of limited oxygen permeability comprises a flexible, collapsible or expandable material which does not puncture when collapsing or expanding or a tote comprising a rigid material. These totes are, in general, constructed of flexible cast or extruded plastic sheeting.

The flexible, collapsible or expandable tote materials for use in this invention are those having limited oxygen permeability. Materials of limited oxygen permeability preferably have an oxygen transmission rate (OTR) of less than 10 cubic centimeters/100 square inch/24 hours/atm, more preferable materials of limited oxygen permeability are materials having an OTR of less than 5 cubic centimeters/100 square inch/24 hours/atm, even more preferably materials of limited oxygen permeability materials having an OTR of less than 2 cubic centimeters/100 square inch/24 hours/atm; most preferably materials of limited oxygen permeability are materials having an OTR of less than 1 cubic centimeters/100 square inch/24 hours/atm. A non-exhaustive list of materials that can be used to make the flexible, collapsible or expandable tote is shown in Table 1.

TABLE 1

| MATERIAL | Moisture Vapor Transmission Rate (MVTR) (gm/100 sq. in./ 24 hours) | Oxygen Transmission Rate OTR (c.c./100 sq. in./ 24 hours/atm) |
| --- | --- | --- |
| Saran 1 mil | 0.2 | 0.8-1.1 |
| Saran HB 1 mil | 0.05 | 0.08 |
| Saranex 142 mil | 0.2 | 0.5 |
| Aclar 33C .75 mil (military grade) | 0.035 | 7 |
| Barex 210 1 mil | 4.5 | 0.7 |
| Polyester 48 Ga. | 2.8 | 9 |
| 50 M-30 Polyester Film | 2.8 | 9 |
| 50 M-30 PVDC Coated Polyester | 0.4 | 0.5 |
| Metallized Polyester 48 Ga. | 0.05 | 0.08-0.14 |
| Nylon 1 mil | 19-20 | 2.6 |
| Metallized Nylon 48 Ga. | 0.2 | 0.05 |
| PVDC-Nylon 1 mil | 0.2 | 0.5 |
| 250 K Cello | 0.5 | 0.5 |
| 195 MSBO Cello | 45-65 | 1-2 |
| LDPE 2 mil | 0.6 | 275 |
| Opp .9 mil | 0.45 | 80 |
| EVAL, Biax 60 Ga. | 2.6 | 0.03 |
| EVAL EF-E 1 mil | 1.4 | 0.21 |
| EVAL EF-F 1 mil | 3.8 | 0.025 |
| Benyl H 60 Ga | 0.7 | 0.4 |

TABLE 1-continued

| MATERIAL | Moisture Vapor Transmission Rate (MVTR) (gm/100 sq. in./ 24 hours) | Oxygen Transmission Rate OTR (c.c./100 sq. in./ 24 hours/atm) |
|---|---|---|
| PVC 1 mil | 4-5 | 8-20 |
| Polycarbonate 1 mil | 9 | 160 |
| Polystyrene 1 mil | 7.2 | 4,800 |
| Pliofilm 1 mil | 1.7 | 660 |

The tote may further comprises one or more low oxygen gas sources exterior and in gaseous contact with the tote via an inlet port to periodically flush the tote, thus removing any oxygen from the environment within the tote via one or more outlet ports. Oxygen may accumulate in the tote during use by, for example, diffusion through the tote through the material of limited oxygen permeability or at the seal of the tote. Oxygen may also be released by the oxidatively-degradable foodstuff within the tote or from containers in which the foodstuff is packaged. In a preferred embodiment, the carbon dioxide is a carbon dioxide gas having less than 10 ppm oxygen.

In some embodiments, the tote further comprises one or more oxygen removers to continuously remove oxygen from the environment within the tote as long as oxygen is present. The oxygen remover maintains the reduced oxygen environment within the tote by continuously removing any oxygen that may be introduced into the system after the tote is sealed. For example, oxygen may be introduced by diffusion through the tote through the material of limited oxygen permeability or at the seal of the tote. Oxygen may also be released by the carbon dioxide absorbing oxidatively-degradable foodstuff within the tote or from containers in which the foodstuff is packaged.

In a preferred embodiment, the oxygen remover is a molecular oxygen-consuming fuel cell. Preferably the fuel cell is a hydrogen fuel cell. As used herein, a "hydrogen fuel cell" is any device capable of converting oxygen and hydrogen into water. In a preferred embodiment, the complete fuel cell is internal to the tote. This can be achieved by having a hydrogen source internal or external to the tote or packaging module. The anode of the fuel cell is in communication with the hydrogen source. This hydrogen source permits generation of protons and electrons. The cathode of the fuel cell is in communication with the environment in the tote (the oxygen source). In the presence of oxygen, the protons and electrons generated by the anode interact with the oxygen present at the cathode to generate water. In a preferred embodiment, the fuel cell does not require an external power source to convert oxygen and hydrogen into water. In a further embodiment, the fuel cell is connected to an indicator that indicates when the fuel cell is operating and when hydrogen is available.

In another embodiment, the physical fuel cell is external to the tote but in direct communication with the gaseous environment of the tote in such a manner that the products produced at the anode and cathode are maintained internal to the tote. One fuel cell may be in gaseous communication with one or multiple totes. In such an embodiment, the fuel cell is construed as internal to the tote since its products are maintained internal to the tote. When the fuel cell is physically positioned outside the tote, water produced by the fuel cell may be released outside the tote.

In a preferred embodiment, the hydrogen source is a pure hydrogen gas. The hydrogen source is preferably contained within a bladder and the bladder is contained internal to the tote so that the entire process is contained within the tote. The hydrogen source is preferably in direct communication with the anode of the hydrogen fuel cell in such a manner as to provide hydrogen for the duration of the transporting or storage time. The bladder is made of any material that is capable of containing the hydrogen gas. For example, the materials listed in Table 1 can be used as bladder material.

In a preferred embodiment, the bladder contains an uncompressed hydrogen source although compressed sources of hydrogen can be used as long as the compressed source can be contained in the bladder.

In another embodiment, the hydrogen source is contained within a rigid container, such as a gas cylinder, contained internal to the tote so that the entire process is contained within the tote. In this embodiment, the hydrogen source is a compressed or uncompressed hydrogen source. The rigid container is in direct communication with the anode of the hydrogen fuel cell in such a manner as to provide hydrogen for the duration of the transporting or storage time. Compressed hydrogen sources are preferably are maintained at a pressure of no greater than 10,000 psia. Preferably, the hydrogen source is uncompressed, which, for example, has a pressure of not greater than 40 psia.

In further embodiments, the hydrogen source is generated by a chemical reaction. Examples of methods of chemically generating hydrogen are well known in the art and include generation of hydrogen by an electrolytic process, including methods using PEM electrolyzers, alkaline electrolyzers using sodium or potassium hydroxide, solid oxide electrolyzers, and generation of hydrogen from sodium borohydride. In each case, the hydrogen is generated so that the hydrogen is made available to the anode of the fuel cell.

In another embodiment, the hydrogen source is a gaseous mixture comprising hydrogen present in the environment of the tote. In this embodiment, the gaseous mixture preferably comprises carbon dioxide and hydrogen. In other embodiments, the gaseous mixture comprises nitrogen and hydrogen. In further embodiments, the gaseous mixture comprises hydrogen, carbon dioxide, and nitrogen. It is contemplated that other inert gases such can be present in the gaseous mixture. The amount of hydrogen present in the gaseous mixture is preferably less than 10% hydrogen by volume, more preferably less than 5% hydrogen by volume, most preferably less than 2% hydrogen by volume. This gaseous mixture is introduced into the tote before, during, or after the introduction of the oxidatively-degradable material and prior to the sealing of the tote.

In some embodiments, the fuel cell comprises a carbon dioxide remover in direct communication with the sealed anode component of the fuel cell. Carbon dioxide has the potential to permeate across the PEM to anode plate, thereby interfering with hydrogen access to the anode plate. Removal of some or all of the carbon dioxide from the anode plate of the fuel cell by the carbon dioxide remover allows increased access to the fuel cell by hydrogen and thus increasing the fuel cells ability to remove oxygen from the tote environment.

There are numerous processes known in the art that can be utilized in the carbon dioxide remover. These methods include absorption processes, adsorption processes, such as pressure-swing adsorption (PSA) and thermal swing adsorption (TSA) methods, and membrane-based carbon dioxide removal. Compounds that can be used in the carbon dioxide removers include, but are not limited to, hydrated lime, activated carbon, lithium hydroxide, and metal oxides such as silver oxide, magnesium oxide, and zinc oxide. Carbon dioxide can also be removed from the anode by purging the anode with a gas, such as hydrogen gas or water vapor.

Figure 6:
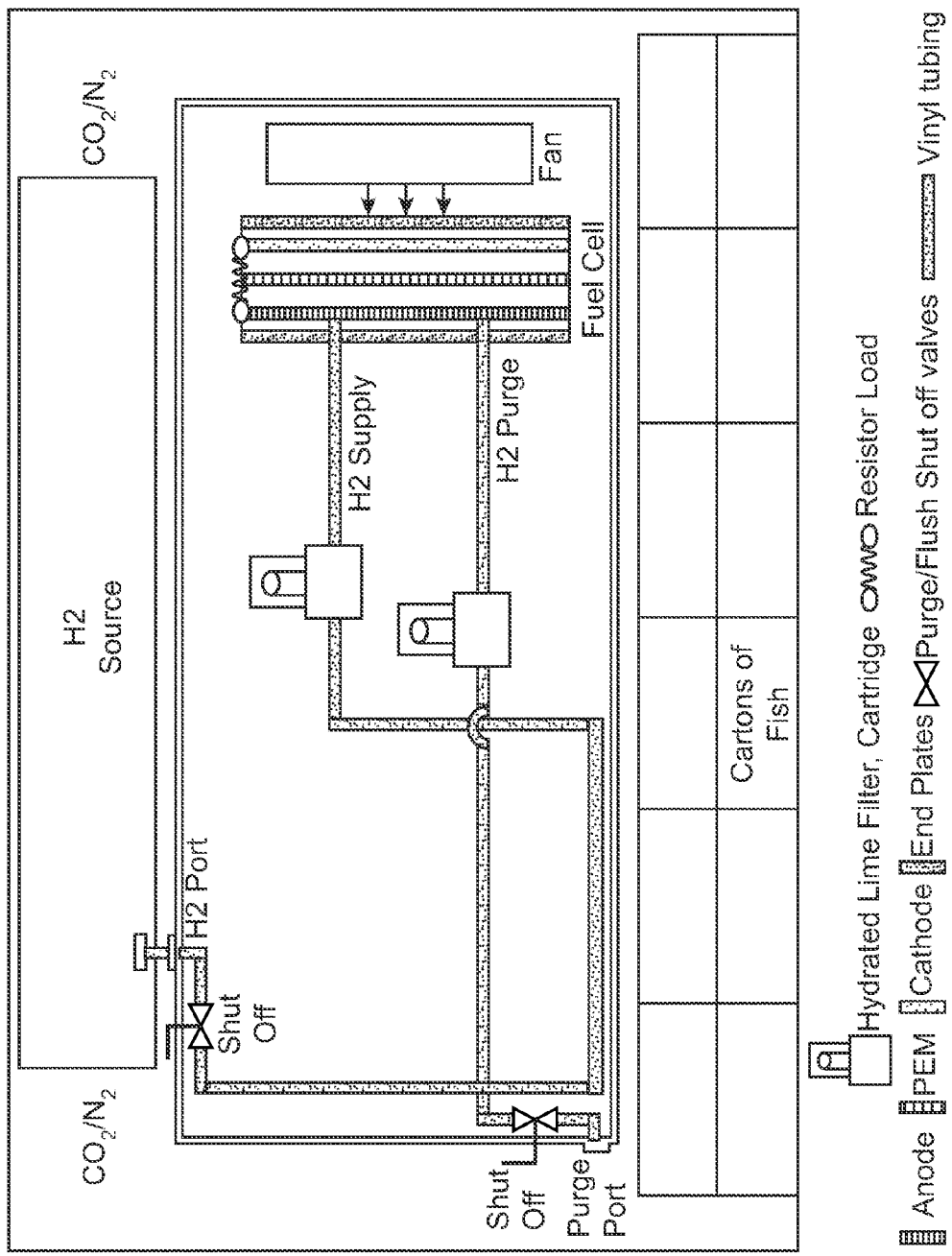
FIG. 6 is a schematic of a fuel cell embodiment of the oxygen remover with a carbon dioxide remover.

In one embodiment, the carbon dioxide remover comprises hydrated lime. In this embodiment, for example, the hydrated lime is contained in a filter cartridge that is in vapor communication with the fuel cell anode so that the carbon dioxide present at anode plate of the fuel cell comes into contact and with and is absorbed to the hydrated lime. A particular embodiment comprises two hydrated lime filter cartridges, each in vapor communication with an anode outlet. The hydrated lime filters facilitate removal of carbon dioxide from the anode plate of the fuel cell (FIG. 6).

The tote can be configured to provide access for tubes, wires, and the like such that the external gases, such as carbon dioxide, can be introduced via an inlet port. The inlet port is provided using fittings that are sealable and can maintain the low oxygen environment within the tote. In some embodiments, an external power source can be used to operate fans and oxygen remover. In one particular embodiment, the tote is configured to permit introduction of hydrogen from an external source into the internal fuel cell hydrogen supply system. In a further embodiment, the external hydrogen source is directed to assist with purging the fuel cell with hydrogen.

Oxygen removers other than hydrogen fuel cells can be used to remove oxygen in the tote. For example, oxygen absorbers, such as iron containing absorbers, and oxygen adsorbers, can be used. Oxygen absorbers and adsorbers are known in the art and are commercially available. Oxygen removers also include removers utilizing pressure swing adsorption methods (PSA) and membrane separation methods.

Catalytic systems, such as those utilizing elemental metal such as platinum or palladium catalysts, can be used as oxygen removers but the use of powders necessary to provide high catalytic surface area runs the risk of contamination. Nevertheless, when appropriate safeguards are used, these can be employed. Such safeguards include embedding the metal catalysts into a membrane electrode assembly such as present in PEM fuel cells.

The tote preferably further comprises a holding element suitable for maintaining the hydrogen source so as the hydrogen source is held stably within the tote. In a preferred embodiment, the holding element is a box configured to stably hold the hydrogen source. In a further preferred embodiment, the holding element is configured to hold both the hydrogen source and the fuel cell. In other embodiments, the holding element is a sleeve affixed to an internal wall of the tote. This sleeve is capable of holding a bladder-containing hydrogen source or rigid container hydrogen source as well as other containers suitable for containing a hydrogen source. In either event, the hydrogen source is in direct communication with the anode of the fuel cell.

When the oxygen remover used in the packaging module is a hydrogen fuel cell, there will be an amount of water, in either liquid or gaseous form, generated as a result of the reaction of hydrogen and oxygen. In some embodiments, the water thus generated is released into the tote. It may be desirable to include within the tote a means for containing or removing the water. For example, the tote may further comprise a water-holding apparatus, such as a tray or tank, configured to collect the water as it is generated at the fuel cell. Alternatively, the tote may contain desiccant or absorbent material that is used to absorb and contain the water. Suitable desiccants and absorbent materials are well known in the art. The water may alternatively be vented outside of the tote, thus providing a suitable environment for the storage and transportation of goods that are optimally stored in dry environments.

The tote is configured to maintain a reduced oxygen environment surrounding the material. The reduced oxygen environment allows for the material to be stored and/or transported for a prolonged period while maintaining freshness of the material. Subsequent to or after the introduction of the material but prior to the sealing of the tote, the environment within the tote is optionally flushed via application of a vacuum and/or introduction of a low oxygen free gaseous source. At this point, the environment within the tote is a reduced oxygen environment. In a particular embodiment, the level of oxygen in the reduced oxygen environment is less than 1% oxygen, or alternatively, the level of oxygen in the reduced oxygen environment is less than 0.1% oxygen, or alternatively, the level of oxygen in the reduced oxygen environment is less than 0.01% oxygen.

After a period of time, the oxygen levels present in the tote or packaging module remain at a reduced level because gaseous exchange between the foodstuff and the tote environment reached a natural minimization or cessation. At this point, the fuel cell will cease operating. In one embodiment, the fuel cell can be programmed to cease operation after an initial period time that is sufficient to allow a natural minimization or cessation of gaseous exchange. Preferably, the fuel cell is programmed to cease operation after a period of between around 0.5 and 50 hours, more preferably, the fuel cell is programmed to cease operation after a period of between around 1 and 25 hours; more preferably, the fuel cell is programmed to cease operation after a period of between around 2 and 15 hours; even more preferably, the fuel cell is programmed to cease operation after a period of between around 3 and 10 hours.

In some embodiments, a low oxygen gaseous source is introduced into the tote before the tote is sealed. The low oxygen gaseous source is preferably comprised of $CO_2$ or mixture of gases containing $CO_2$ as one of its components. $CO_2$ is colorless, odorless, noncombustible, and bacteriostatic and it does not leave toxic residues on foods. In one embodiment, the low oxygen gaseous source is 100% $CO_2$. In another embodiment, the low oxygen gaseous source is a mixture of $CO_2$ and nitrogen or other inert gas. Examples of inert gases include, but are not limited, to argon, krypton, helium, nitric oxide, nitrous oxide, and xenon. The identity of the low oxygen gaseous source can be varied as suitable for the foodstuff and is well within the knowledge and skill of the art. For example, the low oxygen gaseous source used for transport and storage of salmon is preferably 100% $CO_2$. Other fish, such as tilapia are preferably stored or shipped using 60% $CO_2$ and 40% nitrogen as the low oxygen gaseous source.

In order to compensate for the pressure differential that occurs during a prolonged transport or storage, the tote contains an initial headspace volume that allows for absorption of gases, such as oxygen, the low oxygen gaseous source, for example carbon dioxide. The term "initial headspace" is intended to refer to the amount of excess gaseous volume of the tote after the tote is filled with carbon dioxide absorbing oxidatively-degradable foodstuff. In some embodiments, the initial headspace is from about 30% to about 95% the internal volume of the tote. In other embodiments, the initial headspace is from about 35% to about 40% of the internal volume of the tote, or alternatively, the initial headspace is about 30% to about 35% of the internal volume of the tote, or alternatively, the initial headspace is about 35% of the internal volume of the tote.

Figure 7:
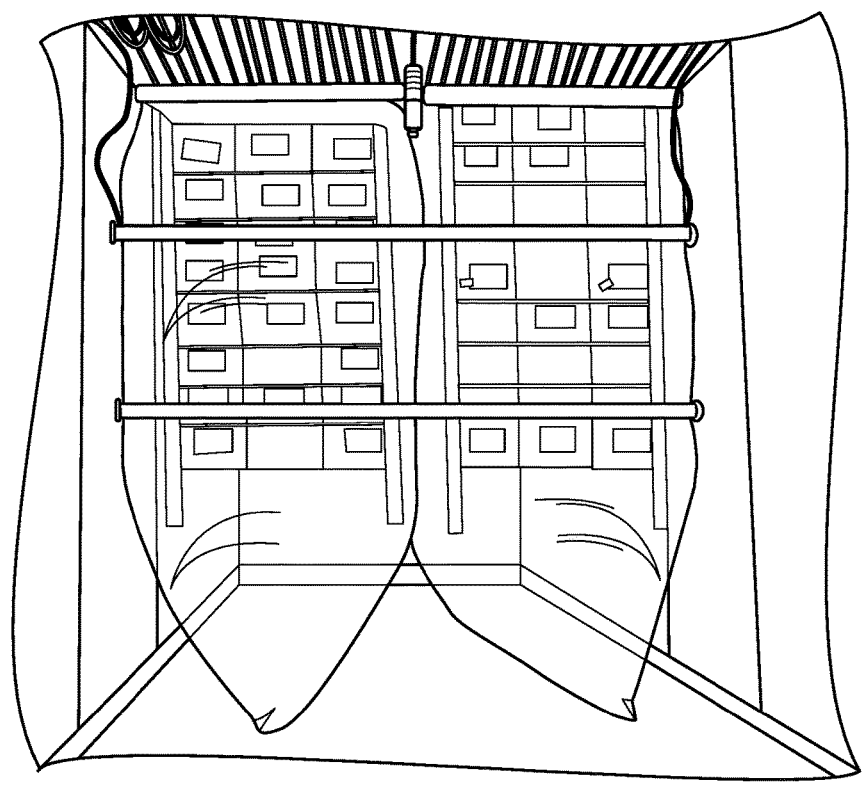
FIG. 7 is a photograph of a packing module embodiment before transporting.
Figure 8:
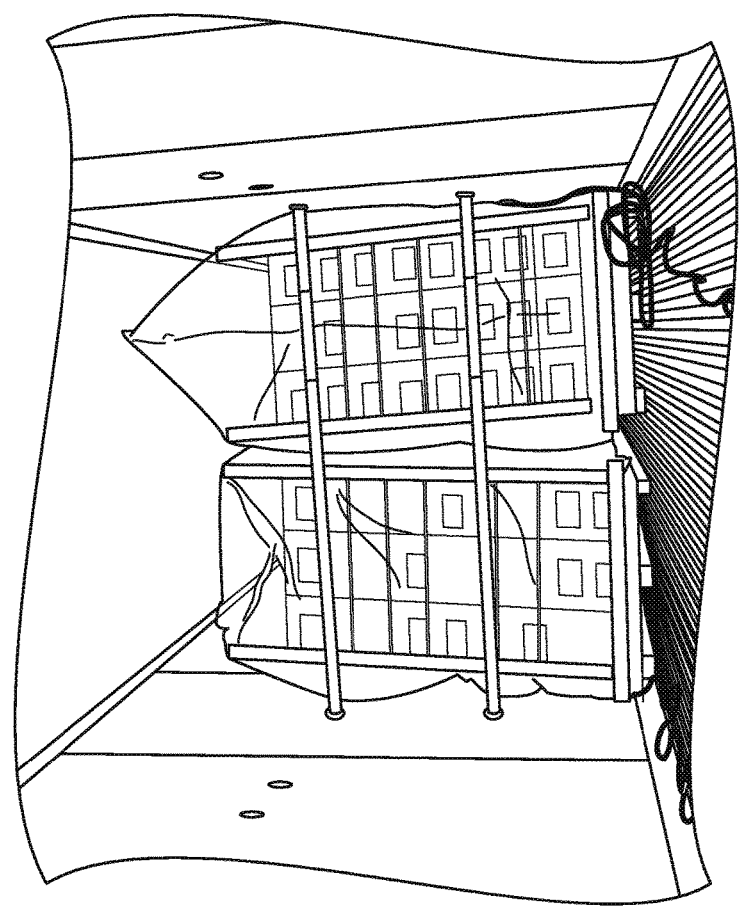
FIG. 8 is a photograph of a packing module embodiment after transporting.

Ultimately, the tote is filled with enough low oxygen gas to provide an initial gaseous headspace such that the volume of gaseous headspace is greater than the volume of gas which is absorbed by the oxidatively-degradable foodstuff to compensate for the pressure differential that occurs during a prolonged transport or storage. The result of the pressure differential can be seen in FIGS. 7 and 8. FIG. 7 shows a flexible tote of the invention which has been filled with a sufficient amount of carbon dioxide to accommodate the absorption of carbon dioxide into the foodstuff throughout the transport and handling cycle of the totes and to prevent negative pressure from being created by the oxygen removal process. FIG. 8 shows the same totes of FIG. 7 after 17 days of transport with a decreased amount of gaseous headspace. Although the photo of FIG. 8 shows that the right tote appears to be inflated more (or deflated less) than the one on the left, both totes were in fact deflated the same when viewed from all sides. The amount of headspace remaining after transport should be sufficient such that a negative pressure is not created as this "vacuumizing" could potentially damage the product, reducing the carbon dioxide concentration below levels effective for inhibiting microbial spoilage and/or increases in residual oxygen concentrations and increased potential for leakage. In certain embodiments the concentration of carbon dioxide in the tote after transport or storage is at least 90%.

The tote is configured such that the internal tote environment is in communication with oxygen remover permitting the continuous removal of molecular oxygen from the internal tote environment as long as there is oxygen present in the tote environment. The oxygen remover in the tote is configured to remove oxygen from the internal tote environment such that the oxygen level remains below a level that would result in a reduction of freshness or spoilage of the material. This reduced level of oxygen is maintained by the oxygen remover for the duration of the transport and/or storage. The level of oxygen in the reduced oxygen environment is less than 1% oxygen, more preferably less than 0.1%, most preferably less than 0.01% oxygen.

The efficiency of the oxygen removers can be enhanced through the use of a fan to circulate the air within the tote thus facilitating contact between the oxygen remover and the oxygen in the tote environment. When using a fuel cell, the fan, in certain embodiments, can be configured to run from the energy created when the fuel cell converts the hydrogen and oxygen to water.

In the event of a breach in the integrity of the tote wherein an unexpectedly large amount of oxygen-containing air is introduced into the tote environment, the oxygen remover would not be able to remove all of the introduced oxygen. In a preferred embodiment, the tote further comprises an oxygen indicator which would alert one to the fact that the oxygen level in the tote had exceeded the levels described as a reduced oxygen environment.

In some embodiments, it is contemplated that multiple flushes with the low oxygen gas would allow for gas absorption by the foodstuff, thus alleviating the need for as much initial headspace. However, it is also contemplated that with a large scale shipment (i.e. 2,000 pounds foodstuff packaged in multiple cartons) a headspace may be necessary as gas absorption requires too many days to be practical for shipping purposes.

In certain embodiments, the totes are able to accommodate a very large headspace (primarily to accommodate $CO_2$ absorption and protect against/delay air leakage), such that the headspace in combination with multiple initial gas flushes would require no continuous oxygen monitoring or further periodic gas flushing beyond the initial multiple gas flushes. It is contemplated that the initial gas flushes can proceed periodically during the first 72 hours of the tote being sealed with the oxidatively degradable foodstuff. Alternatively, the initial gas flushes can proceed during the first 72 hours or less of the tote being sealed, or alternatively, the first 60 hours, or alternatively, the first 48 hours, or alternatively, the first 24 hours.

The vertical architecture of the totes disclosed herein facilitates minimizing horizontal space requirements for shipping the maximum number of pallets side-by-side. Embodiments that spread the headspace out horizontally may not be as economically viable at a large scale in addition to not enjoying the leak resistance as long as the headspace remains positive. In certain embodiments, no more than about 20% of the expansion of the tote is in the horizontal direction, with the remainder of the gaseous expansion being in the vertical direction thus creating the "head pressure" and head space height of the totes. The tote is configured to expand in a vertical manner creating an initial "head pressure". Initial tote head pressures can range from about 0.1 to about 1.0 inches of water column or more above atmospheric pressure.

In certain embodiments, the low oxygen gas source is programmed to flush the interior environment of the tote at predetermined time intervals throughout the duration of the transport and/or storage. In other embodiments, the low oxygen gas source is programmed to flush the interior environment of the tote when the oxygen level of the internal tote environment exceeds a level which is detrimental to the foodstuff. In the beginning of the transport and/or storage, oxygen may be released by the oxidatively-degradable foodstuff within the tote or from containers in which the foodstuff is packaged.

In a preferred embodiment, the tote further comprises an indicator which would alert one to the fact that the oxygen level in the tote had exceeded the levels described as a reduced oxygen environment. In certain embodiments, low oxygen gas source is programmed to flush the interior environment of the tote when the level of oxygen in the reduced oxygen environment is about 2% oxygen, more preferably about 1.5%, more preferably about 1%, more preferably about 0.1%, most preferably about 0.01% oxygen, or when the level of oxygen exceeds about 1500 ppm oxygen. In a particular embodiment, a oxygen sensor, for example, a trace oxygen sensor (Teledyne), is used to monitor the level of oxygen present in the tote environment.

The tote optionally contains monitors to monitor oxygen levels, hydrogen levels, fuel cell operation, and temperature. In a particular embodiment, an oxygen sensor, for example, a trace oxygen sensor (Teledyne), is used to monitor the level of oxygen present in the tote environment.

In some embodiments, the tote comprises a box (see FIG. 9) comprising devices which include the fuel cell, the oxygen indicator which alerts one when the oxygen level in the tote exceeds the levels described as a reduced oxygen environment, and/or monitors to monitor oxygen levels, hydrogen levels, fuel cell operation, and temperature. The box further optionally comprises a visible indicator, such as an LED light, which indicates problems of the devices in the box so that the problematic device or the box can be immediately replaced before sealing the tote. This facilitates rapid detection of any failure by unskilled labor and allows for rapid turn-around of boxes into service with minimal testing. The box also alerts users on arrival of system if oxygen or temperature (time and temperature) limits are exceeded, preferably, using wireless communication, such as radio frequency transmission, along with a visible indicator, such as a red LED light.

Another aspect of the invention provides for a packaging module useful for transporting and/or storing of oxidatively-degradable material. The packaging module comprises a tote configured as described above. In the packaging module the tote is sealed and contains the carbon dioxide absorbing oxidatively-degradable material to be transported and/or stored, and a device that continuously removes oxygen from the environment surrounding the material as long as there is oxygen present. The device is located within the sealed tote. Temperature control means such as air conditioning, heating and the like are preferably not integrated into the packaging module and the size of the module is such that the freight container comprising a single temperature control means can contain multiple modules. In such cases, it is possible for each tote to have different gaseous environments and different packaged materials.

Another aspect of the invention provides for a system for transporting and/or storing carbon dioxide absorbing oxidatively-degradable foodstuff. The system comprises one or more of the packaging modules, each packaging module comprising a tote, a carbon dioxide absorbing oxidatively-degradable foodstuff and an oxygen remover. The packaging module and components thereof are described above.

The system or totes are configured so as to be suitable for transporting and/or storing in a shipping freighter. A shipping freighter means any container that can be used to transport and/or store the system including, but not limited to, an ocean shipping freighter, a trucking shipping freighter (such as a tractor-trailer), a railroad car, and an airplane capable of transporting cargo load. In some embodiments, the tote further comprises a device for monitoring and/or logging the temperature of the system or container. Such devices are commercially available from manufacturers including Sensitech, Temptale, Logtag, Dickson, Marathon, Testo, and Hobo.

As noted above, one or more totes or packaging modules can be used in a single shipping freighter and, accordingly, each can be configured to have a different gaseous environment as well as a different foodstuff. Further, at delivery, opening of the shipping freighter does not result in disruption of the internal atmosphere of any tote or packaging module and, accordingly, one or more of the totes or packaging modules can be delivered at one site and the others at different site(s). The size of each tote or packaging module can be configured prior to shipment to correspond to the quantity of foodstuff desired by each vendee. As such, the totes or packaging modules can preferably be sized to contain as little as a few ounces of foodstuff to as much as, or greater than, 50,000 pounds, or 1 ton of foodstuff. In addition, the vertical architecture facilitates minimizing horizontal space requirements for shipping the maximum number of pallets side-by-side. Embodiments that spread the headspace out horizontally may not be as economically viable at a large scale in addition to not enjoying the leak resistance as long as the headspace remains positive. The number of packaging modules per system depends both on the size of the shipping freighter used to transport and/or store the system and the size of the packaging modules. Specific examples of the number of packaging modules per system is set forth in the description of specific embodiments below.

The size of each packaging module can be sufficiently large such that a shipment of about 500 pounds or more of carbon dioxide absorbing oxidatively-degradable foodstuff can be packaged into a single tote. In some embodiments, about 500 pounds of carbon dioxide absorbing oxidatively-degradable foodstuff can be packaged into a single tote, or alternatively, about 1000 pounds, or alternatively, about 2000 pounds, or alternatively, more than about 2000 pounds. This large size permits a shipping freighter to be filled to capacity without the need for stacking of the totes, thus allowing for the gaseous headspace. If the packaging modules are smaller than the internal dimensions of the shipping freighter, a scaffolding may be employed to house the packaging modules and allow stacking.

In another embodiment, the system comprises one or more totes, each tote containing a carbon dioxide absorbing oxidatively-degradable foodstuff. In this embodiment, the totes are detachably connected to a separate module that contains the oxygen remover. The separate module also contains a hydrogen source when the oxygen remover is a hydrogen fuel cell. The oxygen remover acts to remove the oxygen from all of the totes to which the separate module is connected. In this embodiment, the physical fuel cell is external to the tote but in direct communication with the gaseous environment of the tote. In some embodiments, the products produced at the anode and cathode are maintained internal to the tote. In such an embodiment, the fuel cell is construed as internal to the tote since its products are maintained internally to the tote. In another embodiment, the water produced by the fuel cell is released external to the tote. In another embodiment, the tote is a rigid tote and the separate module further contains a gaseous source to maintain positive pressure in the connected totes. The container optionally contains monitors to monitor oxygen levels, hydrogen levels, and temperature within the totes as well as an indicator that indicates fuel cell operation. In one embodiment, the module is a box that is of similar size to the packaging modules. In another embodiment, the module is affixed to wall, lid, or door of the shipping freighter used to transport and/or store the system.

In some embodiments, the system and/or the shipping freighter also comprises a cooling system for maintaining a temperature of the packaging modules sufficient to preserve the freshness of the carbon dioxide absorbing oxidatively-degradable foodstuff. The temperature required to preserve the freshness of the carbon dioxide absorbing oxidatively-degradable foodstuff is dependent on the nature of this foodstuff. One of skill in the art would know, or would be able to determine, the appropriate temperature required for the material being transported or stored in the system or shipping freighter. For the transport and/or storage of foodstuffs the temperature would generally at about 30° F. (Fahrenheit). The temperature is generally maintained in a range of 32-38° F., more preferably in a range of 32-35° F., most preferably in a range of 32-33° F. or 28-32° F. For example, the appropriate temperature to preserve fish during transport or storage is between 32-35° F. Variation in the temperature is allowed as long as the temperature is maintained within a range to preserve the foodstuff. In some embodiments, the tote further comprises a device for monitoring and/or logging the temperature of the system or container. Such devices are commercially available from manufacturers including Sensitech, Temptale, Logtag, Dickson, Marathon, Testo, and Hobo.

In one embodiment, the system is capable of maintaining the packaging module at a foodstuff-preserving refrigerated temperature. Alternatively, the shipping freighter used to transport and/or store the system is a refrigerated shipping freighter capable of maintaining packaging module at a foodstuff-preserving refrigerated temperature.

It is contemplated that it may be desirable to limit the exposure of the foodstuff to excess hydrogen during transport or storage. Accordingly, in some embodiments, the tote or system is configured to minimize the exposure of the foodstuff to hydrogen present in the tote environment. This can be achieved by removing the excess hydrogen in the tote or system by mechanical methods, chemical methods, or combinations thereof. Examples of chemical methods of removing hydrogen include the use a hydrogen sink comprised of polymers or other compounds that absorb hydrogen. Compounds suitable for use as hydrogen absorbers are known in the art and are commercially available ("Hydrogen Getters" Sandia National Laboratories, New Mexico; REB Research & Consulting, Ferndale, Mich.) The compounds can be present in the tote or can be in direct communication with the cathode of the fuel cell.

Excess hydrogen can be limited by employing mechanical means, including the use of shut off valves or flow restrictors to modulate or shut down the flow of hydrogen into the tote environment. The modulation of hydrogen can be controlled by using an oxygen sensor connected to the hydrogen source such that hydrogen flow is minimized or eliminated when the level of oxygen falls below a minimum set point.

A further aspect of the invention provides for methods for transporting and storing carbon dioxide absorbing oxidatively-degradable foodstuff. The methods utilize the packaging modules and system as described above. In a preferred embodiment, the method comprises removing the oxygen in a packaging module after insertion of a carbon dioxide absorbing oxidatively-degradable foodstuff to generate a reduced oxygen environment within the packaging module. In addition to the carbon dioxide absorbing oxidatively-degradable foodstuff, the packaging module comprises a pressure-stable sealable tote of limited oxygen permeability and oxygen remover. The reduced oxygen environment within the packaging module is created, for example, by flushing the environment within the tote via application of a vacuum and/or introduction of a low oxygen gaseous source to flush the tote. After flushing of the tote, the environment within the tote is a low oxygen environment. The tote is filled with the low oxygen gas to provide an initial gaseous headspace such that the initial headspace occupies at least 30 volume percent of the tote and the gas in the headspace comprises at least 99 vol. percent gases other than oxygen. The tote is then sealed.

In another aspect, the invention provides for methods for transporting and/or storing oxidatively-degradable foodstuff. This aspect provides methods described herein allow for the optional periodic removal of oxygen from the atmospheric environment surrounding an oxidatively degradable foodstuff which is stored in an individual tote within a shipping container.

In a preferred embodiment, the invention comprises a method for removing oxygen from a tote having oxidatively degradable foodstuff(s) which method comprises:
  a) a tote having a sealable gas inlet port and a sealable gas outlet port both ports being positioned in the head space of the tote wherein the tote comprises a flexible, collapsible or expandable material which does not puncture when collapsing or expanding;
  b) adding oxidatively degradable foodstuff(s) to said tote in an amount such that the inlet and outlet ports are not obstructed;
  c) sealing the tote;
  d) conducting one or more initial flushings of the tote with a low oxygen gas source by injecting a sufficient amount of such gas source into the tote through the inlet port while emitting gas through the outlet port so as to provide a low oxygen atmosphere in the tote and a gaseous head space of sufficient volume to permit absorption of gas into the foodstuff without increasing oxygen content in remaining gaseous head space in the tote to a level of above about 1500 ppm;
  e) sealing the inlet and outlet ports; and
  f) optionally periodically flushing the tote with a low oxygen gas source such that after flushing there remains a sufficient gaseous head space to compensate for gas absorption into the foodstuff such that the oxygen concentration in the remaining gaseous head space does not exceed 1500 ppm at any given time.

The low oxygen gaseous source is preferably comprised of $CO_2$ or mixture of gases containing $CO_2$ as one of its components. In one particular embodiment, the low oxygen gaseous source is 100% $CO_2$. In another embodiment, the low oxygen gaseous source is a mixture of $CO_2$ and nitrogen or other inert gas. Examples of inert gases include, but are not limited, to argon, krypton, helium, nitric oxide, nitrous oxide, and xenon. The identity of the low oxygen gaseous source can be varied as suitable for the foodstuff. For example, the low oxygen gaseous source used for transport and storage of salmon is preferably 100% $CO_2$. Other fish, such as tilapia are preferably stored or shipped using 60% $CO_2$ and 40% nitrogen as the low oxygen gaseous source.

The oxygen remover in the packaging module is operated during the transport and/or storage as long as oxygen is present such that the oxygen level remains below a level that would result in a reduction of freshness or spoilage of the material. This reduced level of oxygen may be maintained by the oxygen remover for the duration of the transport and/or storage. The level of oxygen in the reduced oxygen environment is less than 1% oxygen, more preferably less than 0.1%, most preferably less than 0.01% oxygen.

After a period of time, the oxygen levels present in the tote remain at a reduced level because gaseous exchange between the foodstuff and the tote environment reached a natural minimization or cessation. In one embodiment, the low oxygen gas source can be programmed to cease operation after an initial period time that is sufficient to allow a natural minimization or cessation of gaseous exchange. Preferably, the low oxygen gas source is programmed to cease operation after a period of between around 0.5 and 50 hours, more preferably, the low oxygen gas source is programmed to cease operation after a period of between around 1 and 25 hours; more preferably, the low oxygen gas source is programmed to cease operation after a period of between around 2 and 15 hours; even more preferably, the low oxygen gas source is programmed to cease operation after a period of between around 3 and 10 hours.

Alternatively, the low oxygen gas source can be programmed to cease operation when the oxygen level reaches and is maintained below a predetermined level. In one embodiment, the oxygen level reaches and is maintained below 5% oxygen v/v, or alternatively, the oxygen level reaches and is maintained below 1% oxygen v/v, or alternatively, the oxygen level reaches and is maintained below 0.1% oxygen v/v, or alternatively, the oxygen level reaches and is maintained below about 1500 ppm oxygen.

In some embodiments, the initial flush with the low oxygen gas source is sufficient to maintain the low oxygen environment during the transportation and/or storage of the oxidatively-degradable foodstuffs.

In embodiments where the fuel cell is present in a module that is external to the totes, the module can be removed after an initial period of time that is sufficient to allow a natural minimization or cessation of gaseous exchange or when the oxygen level reaches and is maintained below a predetermined level according to the parameters discussed above. Any external source of gas used to maintained the positive pressure within the tote can be removed as well after the gaseous exchange between the foodstuff and the tote environment reaches a natural minimization or cessation because the need compensate for a change in pressure within the tote is minimized.

In a preferred embodiment, the method relates to the system for transporting or storing carbon dioxide absorbing oxidatively-degradable material as described above. Thus, in a preferred embodiment, the method comprises transporting or storing one or more of the packaging modules in a single freight container. In this embodiment, the individual packaging modules or totes are separately removable from the system. This feature allows for the delivery of individual packaging modules, or the totes of the packaging modules, without disturbing the integrity of the packaging modules or totes remaining in the system.

The totes, packaging modules and/or the system are then used to transport and/or store the oxidatively-degradable material, for example the carbon dioxide absorbing oxidatively-degradable foodstuff, for an extended time period. Preferably, the extended time period is from between 1 and 100 days; more preferably the extended time period is from between 5 and 50 days, even more preferably the extended time period is from between 15 and 45 days.

The methods described herein allow for the oxidatively-degradable material to be transported or stored for a prolonged period of time not possible using standard MAP technology or other standard food storage methods. The prolonged period will vary according to the nature of the oxidatively-degradable material. It is contemplated that using the methods disclosed herein, fresh salmon can be stored or transported in a preserved manner for a prolonged period of at least 30 days. In contrast, fresh salmon can only be stored or transported in a preserved manner for a period of from between 10-20 days in the absence of a reduced oxygen environment. (See the Examples).

DESCRIPTION OF SPECIFIC EMBODIMENTS

The following description sets forth a specific embodiment that can be used in the present invention. The specific embodiment is but one of the possible configurations and uses of the present invention and should not be construed in any manner as a limitation of the invention.

The present invention is particularly suited for the transport and storage of fish, such as salmon. In particular, the invention allows farmed Chilean salmon to be shipped via shipping freighter to destinations in the United States. The length of this transport (approximately 30 days) requires the use of the present invention to preserve the freshness of the salmon. Traditionally, Chilean salmon must be shipped via air freight in order to reach destinations in the United States before the salmon would spoil.

The salmon is prepackaged in cases. Each case contains about 38.5 pounds of salmon. Sixty four of these cases are placed into one tote. The tote is sized at approximately 50"×42"×130", 42"×50"×130" or 48"×46"×100" and is made of a poly/Nylon blend material. The tote is oversized by about 35% or 50% to provide sufficient gaseous headspace and allow for $CO_2$ (and oxygen) absorption. The tote has one presealed end and one sealable end. The tote is placed presealed end down on a pallet. The pallet is preferably covered with a protective sheet to protect the tote and provide stability to the tote. Fifty four cases of the salmon are stacked in the tote. A schematic of a tote is shown in FIG. 1.

Another box, ideally with the same dimension as a salmon case is added to the tote. This box contains one or multiple hydrogen fuel cells and a hydrogen source. The hydrogen source is a bladder that contains pure hydrogen. The bladder is configured to be in direct communication with the anodes of the fuel cells to allow the hydrogen fuel cells to convert any oxygen present in the tote into water for the duration of the transport and/or storage.

The box also contains a fan to circulate the air within the tote thus facilitating contact between the oxygen remover and the oxygen in the tote environment. The fan is powered from the energy created when the fuel cells convert oxygen to water or by a separated battery.

Furthermore, the box contains a temperature recorder so that a record of temperature changes can be made for the duration of the transport and/or storage. Similarly, the box contains an oxygen level recorder so that a record of oxygen levels can be made for the duration of the transport and/or storage. The box also contains an indicator that provides a warnings as to when the oxygen levels within the tote exceeds a specified maximum level or the temperature reaches a specified maximum level. In this specific embodiment, the indicator would warn if the oxygen level exceeded 0.1% oxygen and if the temperature exceeds 38° F. The box may further contain monitors to monitor hydrogen levels and fuel cell operation. The box further optionally comprises a visible indicator, such as an LED light, which indicates problems of the devices in the box and alerts users on arrival of system if oxygen or temperature limits are exceeded, preferably, using wireless communication, such as radio frequency transmission, along with a visible indicator, such as an LED light.

Figure 3:
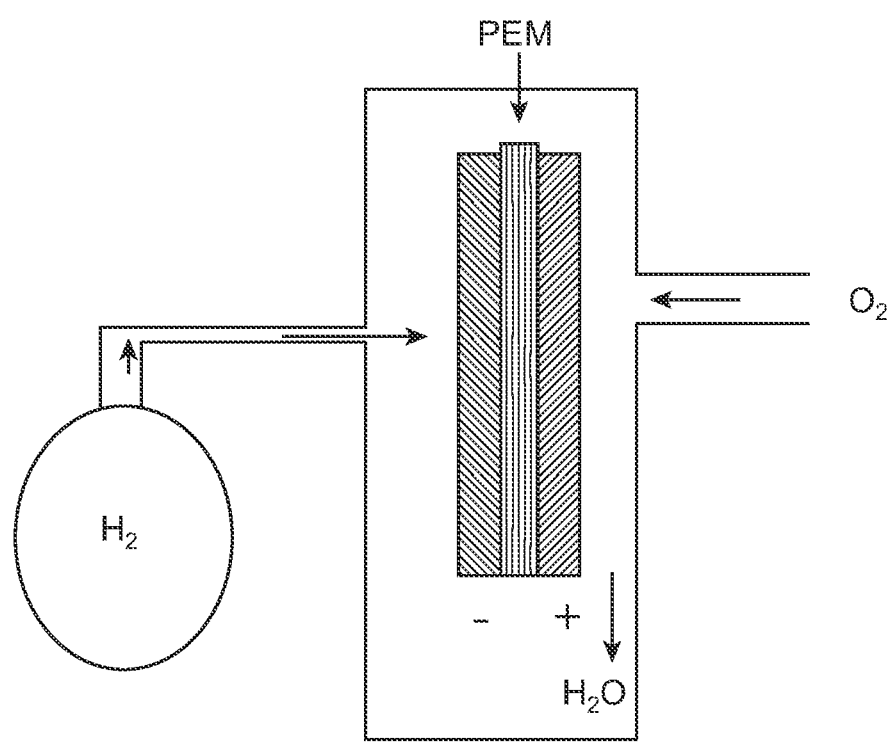
FIG. 3 is a schematic of a fuel cell embodiment of the oxygen remover.

The salmon cases and the box are then unitized (cornered and strapped) and the tote is pulled up around all four sides of the unitized stack with the open end of the tote gathered into a heat sealer. A gas flush of up to 100% carbon dioxide is performed until the residual oxygen is less than about 5% v/v, and preferably less than about 1% v/v. The tote is over-filled with carbon dioxide such that the initial headspace occupies about 50 or 30 volume percent of the tote. After the environment in the tote has been so modified, a heat seal cycle is initiated and the tote is sealed, forming the packaging module. The fuel cell operates for the duration of the transport and storage to remove any oxygen introduced into the packaging module by diffusion through the tote material or at the seal of the tote. Small amounts of oxygen may also be released by fish or packaging materials within the packaging module. The type of fuel cell used is a PEM fuel cell that does not require any external power source in order to convert the oxygen and hydrogen into water. See FIG. 3.

Figure 2:
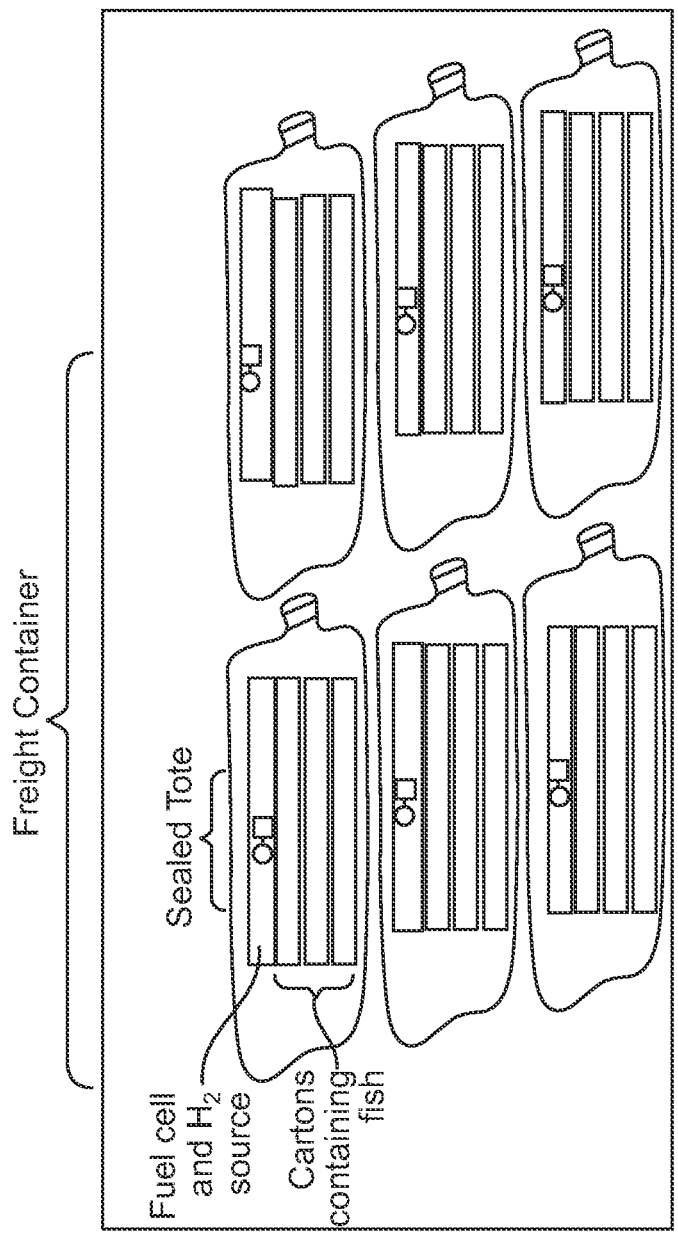
FIG. 2 is a schematic of a system comprising a plurality of the packaging modules in a container.

The packaging module is loaded into a refrigerated shipping freighter along with additional packaging modules configured as described. See FIG. 2. This system of packaging modules is loaded onto a refrigerated ocean shipping freighter. The shipping freighter transports the salmon from Chile to the United States. After reaching the first destination in the United States, a certain number of the packaging module are removed from the shipping freighter. Because each of the totes contains fuel cells to remove oxygen, the packaging modules remaining on the freighter can be transported to other destinations, via the ocean shipping freighter or by secondary land or air shipping freighters, under reduced oxygen conditions.

Example 1

Two bench top rigid containers were constructed, one with and one without a fuel cell. Two nine-liter plastic food storage containers with sealable lids were modified so that gases could be flushed and continuously introduced (at very low pressure) into each container. A commercially available fuel cell (hydro-Genius™ Dismantable Fuel Cell Extension Kit, purchased through The Fuel Cell Store) was installed into the lid of one nine liter rigid container such that hydrogen could also be introduced from the outside of the rigid container directly into the (dead ended) anode side of the fuel cell. The cathode side of the fuel cell was fitted with a convection flow plate allowing for container gases to freely access the fuel cell cathode. Sodium borohydride was purchased from the Fuel Cell Store as a chemical source of hydrogen gas (when mixed with water). A sodium borohydride ($NaBH_4$) reactor was constructed from two plastic bottles such that hydrostatic pressure could be applied for constantly pushing the hydrogen into the fuel cell and adjusting for excess hydrogen production and consumption. This allowed unattended hydrogen production and introduction into the fuel cell for extended periods (days).

Carbon dioxide cylinders (gas), regulators, valves and tubing were purchased along with a large home refrigerator. The refrigerator was plumbed to allow for external carbon dioxide to be continuously introduced into the rigid containers and hydrogen to the fuel cell.

The bench top system was tested by flushing the initial oxygen level down to near 1% with $CO_2$, closing off the outflow valves leaving the inflow valves opened, maintaining both containers under a very low constant pressure of $CO_2$. The oxygen and $CO_2$ concentrations were measured over time using a (Dansensor) $CO_2$/Oxygen analyzer while the fuel cell consumed the remaining oxygen from the one container. It was determined that the container with fuel cell was capable of maintaining oxygen levels below 0.1% while the container without a fuel cell was unable to hold oxygen levels below 0.3%.

On Day 1, Fresh Chilean Atlantic Salmon filets were purchased directly from a local (Sand City, Calif.) retail store. The salmon was taken from a Styrofoam container with a label that indicated that the (loins without fat) were packed in Chile six days previously. The retail outlet personnel placed 6 fillets (2 each) into retail display trays, stretch wrapped, weighed and labeled each of the three trays.

These three packages were transported on ice to the lab where each tray was cut in half so that half of each package could be directly compared to the other half in a different treatment. The package halves were placed into three treatment groups; 1.) Air Control, 2.) 100% $CO_2$, No Fuel Cell oxygen remover, 3) 100% $CO_2$ with Fuel Cell oxygen remover. All three treatments were stored in the same refrigerator at 36 degrees F. for the duration of the experiment. Oxygen and $CO_2$ levels were monitored daily and sensory evaluations were conducted as described below. After initial removal of oxygen, the oxygen levels remained at a level undetectable by the instrumentation. The results are shown in Table 2.

TABLE 2

| Day | Fuel Cell - $O_2$ level | No Fuel Cell - $O_2$ level |
| --- | --- | --- |
| 0 | 0.0 | 0.0 |
| 1 | 0.0 | 0.5 |
| 2 | 0.0 | 0.7 |
| 3 | 0.0 | 0.7 |
| 4 | 0.0 | 0.8 |
| 5 | 0.0 | 0.8 |
| 6 | 0.0 | 0.8 |
| 7 | 0.0 | 0.8 |
| 8 | 0.0 | 0.7 |
| 9 | 0.0 | 0.7 |
| 10 | 0.0 | 0.7 |
| 14 | 0.0 | 0.6 |
| 16 | 0.0 | 0.5 |
| 19 | 0.0 | 0.4 |
| 22 | 0.0 | 0.3 |

Figure 4:
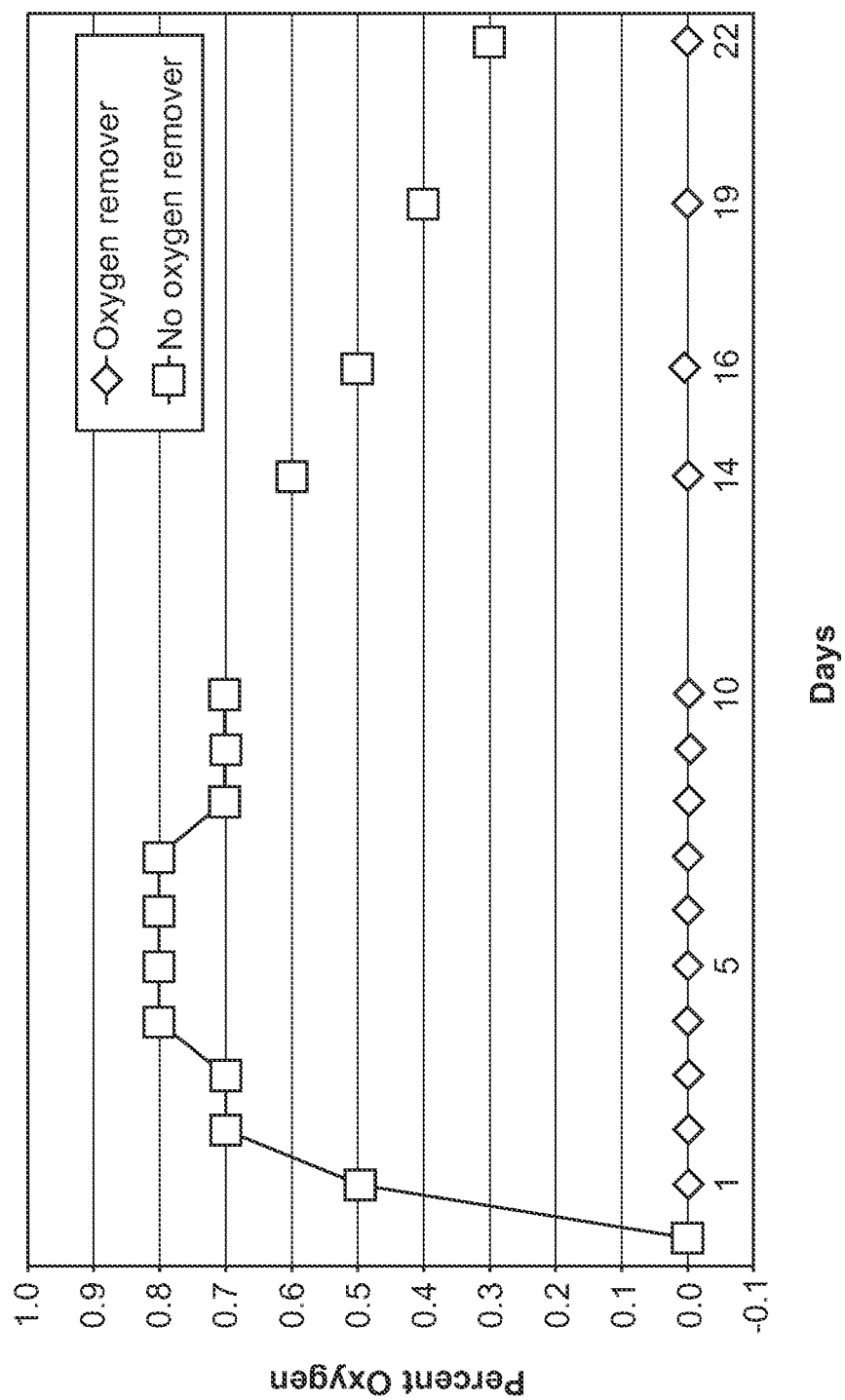
FIG. 4 is a graph showing the increased duration of low oxygen levels using the packaging module as compared to a standard MAP system.

The levels of oxygen for the duration of the experiment are shown graphically in FIG. 4.

Sensory Evaluations:

Seven days after placing the three treatments in the refrigerator, the air controls were judged marginally spoiled by odor and unacceptably spoiled on the $8^{th}$ day at 36° F. This established a total shelf life of approximately 13 days from production for the air control fillets and 7 days at 36° F. (after the first 6 days at unknown temperatures).

After 22 days in the high $CO_2$ environment (plus 6 days before the test began) fillets from the fuel cell and non-fuel cell treatments were removed from the containers and evaluated by 4 sensory panelists. The evaluation scale was 5=Freshest, 4=Fresh, 3=Slightly Not Fresh, 2=Not Fresh, 1=Unacceptable. The raw sensory results are shown in Table 3.

TABLE 3

| | Day 6 + 22 | | | | | | | | |
| --- | --- | --- | --- | --- | --- | --- | --- | --- | --- |
| TREATMENT-SAMPLE | Fresh Odor | Off Odor Rancid | Flesh Color (pink-orange) | Sheen Clarity | Fat Color | Fat Odor | Firmness | Moistness | Slimy |
| Mean Evaluation with Fuel Cell | 4.3 | 4.5 | 4.8 | 3.8 | 3.8 | 3.7 | 4.0 | 4.0 | 4.7 |
| Mean Evaluation with No Fuel Cell | 2.9 | 3.1 | 2.8 | 2.5 | 3.0 | 3.3 | 4.0 | 4.0 | 4.7 |

Figure 5:
FIG. 5 is a photograph of fresh Chilean Atlantic farmed salmon stored in the packaging module as compared to a standard MAP storage system.

After an additional 6 days of storage in air at 36° F., the remaining samples were photographed raw and the "No Fuel Cell" samples were deemed inedible due primarily to rancid off odors (not microbial spoilage) and a very yellowish flesh color. The "Fuel Cell" samples were rated fresh (4) in raw color and odor. These samples were then cooked and evaluated by the 4 panelists for flavor and texture and rated Fresh (4) in both attributes. A visual comparison of the salmon samples is presented in FIG. 5.

In summary, the "Fuel Cell" samples were still rated fresh after a total of 34 days of fresh shelf life while the "No Fuel Cell" samples were unacceptable.

Example 2

FIG. 7 shows flexible totes (as disclosed hereinabove) shortly after gas flushing with carbon dioxide having an initial headspace of about 30 volume percent. Each of the totes are approximately 42"×50"×130" and contain approximately 2,000 to 2,200 pounds of fish contained in 54 individual cartons. Other sizes of totes can also be used, for example, totes having the size of 50"×42"×130" or 48"×46"×100". The totes were initially flushed with nitrogen (via valves & plumbing). After about 8 or more hours, the totes were flushed with carbon dioxide to achieve a very low oxygen level before turning on the fuel cell. It is contemplated that the nitrogen flush can be replaced using only a single $CO_2$ flushing episode and a fuel cell. Holes were cut (in-flow and out-flow) (or plumbing can be used) to initially flush the $CO_2$ into the tote to arrive at greater than 90% $CO_2$. In addition, a nitrogen flush can be employed to reduce the oxygen level to about 1% oxygen after which the valves are closed and wait for at least 9 hours to allow trapped oxygen to evolve from the packaging and product. At that point (after 9 hours) oxygen has generally risen to 1.5 to 2% and the totes are flushed with $CO_2$ up to at least 90% (less than 1,500 ppm oxygen) and close the valves for shipment. The fact that we are dealing with a 2,000 pound package (instead of a 40 pound package) combined with the fact that this process is done "off line" where most MAP processes are done "in line" makes the multiple gas flushes over a longer period of time economically viable.

FIG. 8 shows the same flexible totes 17 days later after transport and storage. The totes permitted an initially high volume of $CO_2$ inside the totes in order to accommodate the absorption of $CO_2$ into the fish throughout the transport and handling/storage of the totes. In addition, the initial gaseous headspace prevented negative pressure from being created by oxygen removal. It is important to note that these totes were not leaking and that the degree of deflation seen in FIG. 8 (as compared to FIG. 7) is primarily due to $CO_2$ absorption during the 17 days of transport. $CO_2$ levels remained above 90% throughout the transport and storage. The fish was then assessed for freshness.

Figure 9:
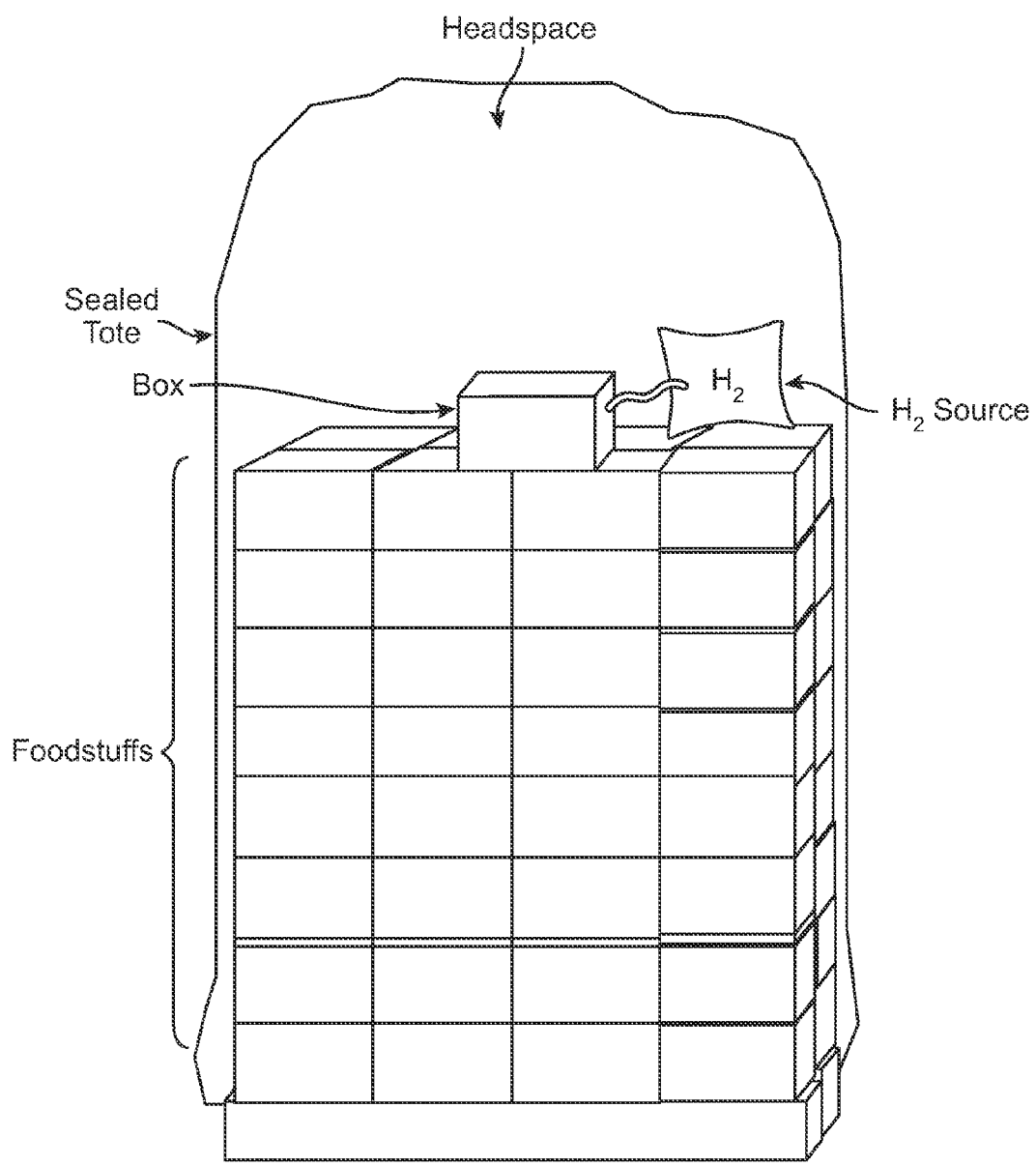
FIG. 9 shows an exemplifying tote.

FIG. 9 illustrates a tote comprising about 1 ton of fish, a hydrogen bladder and a box which comprises a fuel cell, an oxygen indicator indicating whether the oxygen level in the tote exceeds the levels described as a reduced oxygen environment, and monitors to monitor oxygen levels, hydrogen levels, fuel cell operation, and temperature. The box further comprises an LED light, which indicates problems of any of the devices in the box and a wireless alerting system to alert users on arrival of the system if oxygen or temperature (time and temperature) limits are exceeded.

In summary, each tote comprised an initial carbon dioxide containing headspace of about 30 volume percent. The gas in the totes remained between 90 to 100% $CO_2$ throughout transport and handling, resulting in the inhibition of microbial spoilage.

Example 3

Figure 10:
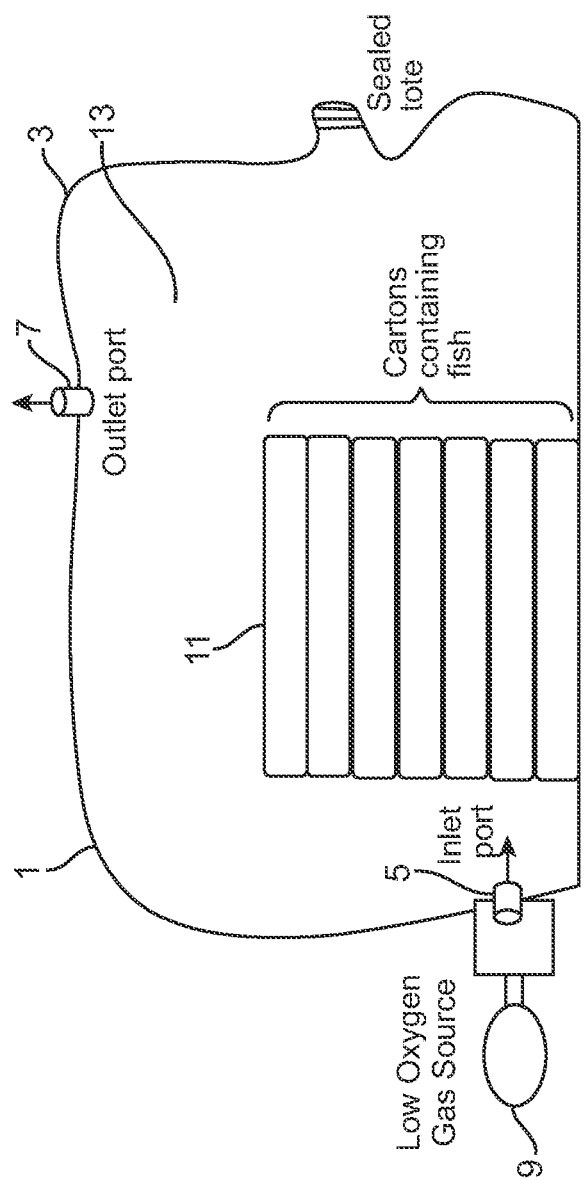
FIG. 10 is a schematic of a tote used to transport or store oxidatively-degradable material.
Figure 11:
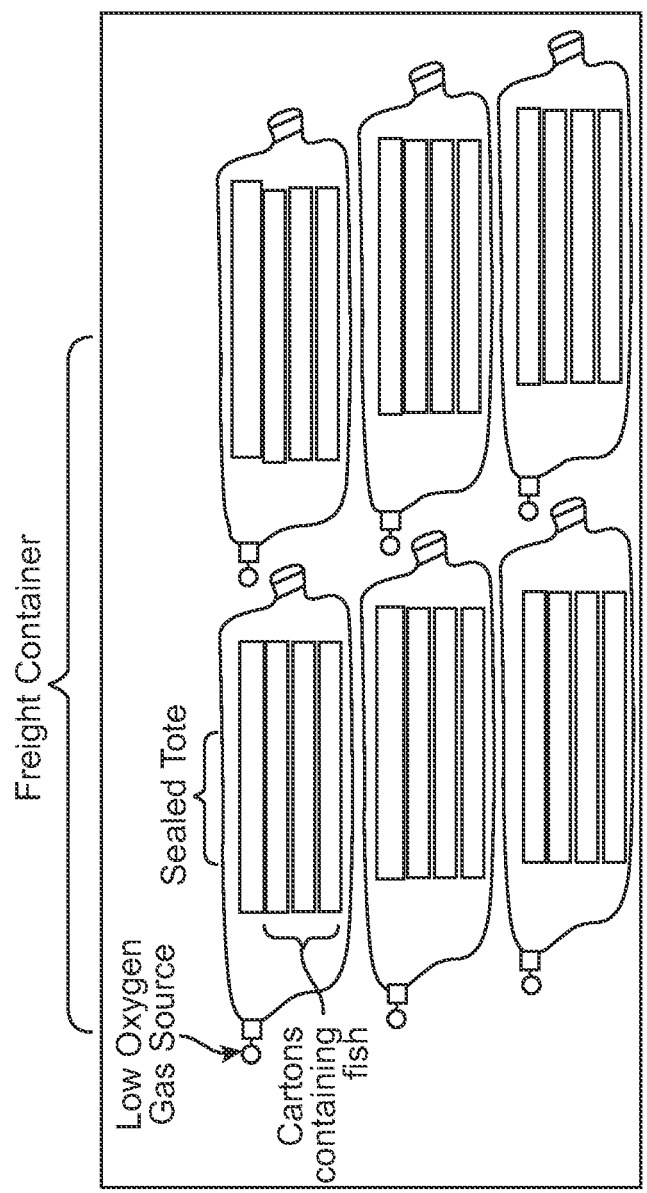
FIG. 11 is a schematic of a system comprising a plurality of the totes connected to a low oxygen gas source in a shipping freighter.

Reference is made to FIG. 10, wherein tote 1 comprises a flexible oxygen impermeable barrier layer 3, inlet port 5 and outlet port 7, wherein the inlet port 5 is connected to a low oxygen gas source 9. Tote 1 contains foodstuff (e.g. fish) 11 and head space 13. Headspace 13 provides for a significant oversizing of the tote relative to the foodstuff 11 contained therein. In one embodiment, the oversizing provides for a head space of up to 40% volume percent of the tote.

This unique architecture disclosed herein includes major over-sizing of the tote 1 and head space 13 (see FIG. 12), in-flow (inlet) and vent (outlet) openings and gas flushing (as opposed to vacuum, followed by gas injection). Also, the tote is loaded by placing oxidatively degradable foodstuffs inside the tote with the tote positioned on a pallet with the factory sealed end (closed end) on the bottom (as opposed to having the factory seal is the top as the tote is placed over the top of the foodstuffs). The tote is then be heat sealed across the top of the tote (above the foodstuffs) after the foodstuffs are stacked or positioned "inside" the tote, sitting on a pallet. In-flow (Inlet) and vent (outlet) openings are employed in the tote to facilitate gas flushing through the tote to lower oxygen. The in-flow of gas is positioned to be at the bottom of the pallet with the out-flow at the top on the opposite side (to encourage top to bottom flushing). Valves or holes (taped over) can be used for in-flow and/or out-flow. When $CO_2$ is used, which is much heavier than air, one can flow $CO_2$ slowly into the bottom of the tote such that the tote fills up much like a swimming pool with the $CO_2$ pushing the air up and out the vent. The last step after flushing is to inflate the head space area of the tote to maximize the head pressure and the head space of the tote before closing the vent (outlet port) and shutting off the in-flow (inlet) of low oxygen gas(es). After the $CO_2$ level reaches 90+%, the gas flow is stopped and the tote held for several hours up to a day or more to allow for trapped oxygen to diffuse out of the packaging and perishable contents such that a subsequent flush/fill will remove the majority of that residual oxygen. The major oversized headspace remains necessary due to the long duration of complete $CO_2$ absorption and the extra reservoir (and slight positive pressure) created by the extra headspace to discourage leakage of air into the tote (should a leak exist).

Figure 12:
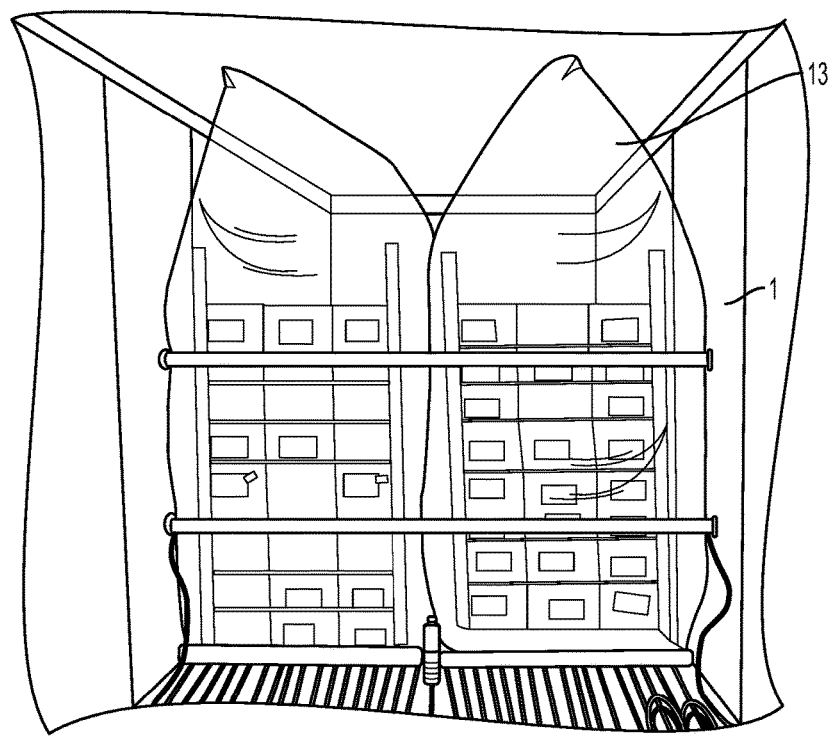
FIG. 12 is a picture of totes loaded with oxidatively-degradable material in a shipping freighter.

As shown in FIG. 12, the tote 1 also utilizes a "head pressure", which is created by the maximized head space 13 height of the flexible tote. It is believed that the height of $CO_2$ confined in the vertical tote creates positive pressure, much like an inflated balloon. Although in FIG. 12 the tote is not literally pressurized via stretching, it could be by constructing the tote from a suitable material. In one example, the tote is inflated to a pressure of about 2.2 inches of water column or more above atmospheric pressure and the decay down to about 1.8 inches of water column is timed to detect leaks. After the tote passes the leak test (6 minutes or more) the tote is then gas flushed and it is contemplated that the final gas flush results in about 0.5 or less inches of water column. The tote is "ballooned" at that point. The plastic is configured to expand in a vertical manner and such methods and materials are known in the art. Initial tote head pressures can range from about 0.1 to about 1.0 inches of water column or more above atmospheric pressure. In addition, the vertical architecture facilitates minimizing horizontal space requirements for shipping the maximum number of pallets side-by-side. No more than 20% of the expansion of the tote is in the horizontal direction, with the remainder of the gaseous expansion being in the vertical direction thus creating the "head pressure" and head space height.

In certain embodiments, the totes are able to accommodate a very large headspace (primarily to accommodate $CO_2$ absorption and protect against/delay air leakage), such that the headspace in combination with multiple initial gas flushes would require no continuous oxygen monitoring or further periodic gas flushing beyond the initial multiple gas flushes. It is contemplated that the initial gas flushes can proceed periodically during the first 72 hours of the tote being sealed with the oxidatively degradable foodstuff. Alternatively, the initial gas flushes can proceed during the first 72 hours or less of the tote being sealed, or alternatively, the first 60 hours, or alternatively, the first 48 hours, or alternatively, the first 24 hours.

What is claimed is:

1. A method for transporting and/or storing of carbon dioxide absorbing oxidatively-degradable foodstuffs which comprises:
   a) removing the oxygen in a packaging module containing an carbon dioxide absorbing oxidatively-degradable foodstuff to generate a reduced oxygen environment within the packaging module, the packaging module comprising a pressure-stable sealable tote of limited oxygen permeability and a gaseous headspace wherein said tote consists of a flexible, collapsible or expandable material which does not puncture when collapsing or expanding, a fuel cell, and a hydrogen source, wherein the limited oxygen permeability comprises an oxygen transmission rate of less than 10 cubic centimeters/100 square inch/24 hours/atm;
   b) flushing the tote with an inert gas such that the initial gaseous headspace occupies at least 30 volume percent of the tote and the gas in the initial gaseous headspace comprises at least 99 volume percent gases other than oxygen, and no more than about 20% of the initial gaseous headspace of the tote is in the horizontal direction, with the remainder of the initial gaseous headspace being in the vertical direction;
   c) sealing the tote;
   d) operating the fuel cell during transport or storing such that oxygen is converted to water by the hydrogen present in the tote to maintain the reduced oxygen environment within the tot;
   wherein an anode of the fuel cell is in communication with the hydrogen source and a cathode inlet of the fuel cell is in communication with the environment in the tote and in a presence of the oxygen in the environment in the tote, protons and electrons are generated by the anode, and the protons interact with the oxygen present at the cathode to generate water and to remove the oxygen from the environment in the tote, wherein the fuel cell does not require an external power source to convert the hydrogen and oxygen into water; and
   e) transporting or storing the material in the tote.

2. The method of claim 1, wherein the gas in the initial gaseous headspace comprises at least about 90% carbon dioxide.

3. The method of claim 1, wherein the initial gaseous headspace comprises from about 30% to about 69% of the total internal volume of the tote.

4. The method of claim 1, wherein the transporting or storing is for a time period from between 5 and 50 days.

5. The method of claim 4, further comprising maintaining a temperature in the tote sufficient to maintain freshness of the material during transport or storage.

6. The method of claim 1, wherein the reduced oxygen environment comprises less than 1% oxygen.

7. The method of claim 1, wherein the reduced oxygen environment comprises carbon dioxide and/or nitrogen.

8. The method of claim 1, wherein the foodstuff is fish.

9. The method of claim 1, wherein the fuel cell is programmed to cease operation after an initial period of time that is sufficient to allow a natural minimization or cessation of gaseous exchange.

10. The method of claim 9, wherein the fuel cell is programmed to cease operation when the oxygen level reaches and is maintained below a predetermined level.

11. The method of claim 10, wherein the predetermined level of oxygen is below 5% oxygen v/v.

12. The method of claim 1, wherein the limited oxygen permeability comprises an oxygen transmission rate of less than 5 cubic centimeters/100 square inch/24 hours/atm.

13. The method of claim 1, wherein the limited oxygen permeability comprises an oxygen transmission rate of less than 2 cubic centimeters/100 square inch/24 hours/atm.

14. The method of claim 1, wherein the limited oxygen permeability comprises an oxygen transmission rate of less than 1 cubic 30 centimeters/100 square inch/24 hours/atm.

15. A method for transporting and/or storing of carbon dioxide absorbing oxidatively-degradable foodstuffs which comprises:
   a) obtaining a pressure-stable sealed tote of limited oxygen permeability and comprising a gaseous headspace and a carbon dioxide absorbing oxidatively degradable material, wherein the initial gaseous headspace occupies at least 30 volume percent of the tote and the gas in the initial gaseous headspace comprises at least 99 volume percent gases other than oxygen, and no more than about 20% of the initial gaseous headspace of the tote is in the horizontal direction, with the remainder of the initial gaseous headspace being in the vertical direction, further wherein the tote consists of a flexible, collapsible or expandable material which does not puncture when collapsing or expanding, and further wherein the tote is connected to a module comprising a fuel cell and a source of hydrogen such that the anode of the fuel cell is in direct communication with the environment of the tote, wherein the limited oxygen permeability comprises an oxygen transmission rate of less than 10 cubic centimeters/100 square inch/24 hours/atm;
   b) operating the fuel cell during transport or storing such that oxygen in the tote is converted to water by the fuel cell, wherein an anode of the fuel cell is in communication with the hydrogen source and a cathode inlet of the fuel cell is in communication with the environment in the tote and in a presence of the oxygen in the environment in the tote, protons and electrons are generated by the anode, and the protons interact with the oxygen present at the cathode to generate water and to remove the oxygen from the environment in the tote, wherein the fuel cell does not require an external power source to convert the hydrogen and oxygen into water; and
   c) transporting or storing the material in the tote.

16. The method of claim 15, wherein the gas in the initial gaseous headspace comprises at least about 90% carbon dioxide.

17. The method of claim 15, wherein the initial gaseous headspace occupies from about 30 to about 35% of the internal volume of the tote.

18. The method of claim 15, wherein the module is disconnected from the tote after an initial period of time that is sufficient to allow a natural minimization or cessation of gaseous exchange.

19. The method of claim 15, wherein the module is disconnected from the tote when the oxygen level reaches and is maintained below a predetermined level.

20. The method of claim 15, wherein the limited oxygen permeability comprises an oxygen transmission rate of less than 5 cubic centimeters/100 square inch/24 hours/atm.

21. The method of claim 15, wherein the limited oxygen permeability comprises an oxygen transmission rate of less than 2 cubic centimeters/100 square inch/24 hours/atm.

22. The method of claim 15, wherein the limited oxygen permeability comprises an oxygen transmission rate of less than 1 cubic 30 centimeters/100 square inch/24 hours/atm.

\* \* \* \* \*